(12) United States Patent
Redmann

(10) Patent No.: US 8,764,196 B2
(45) Date of Patent: Jul. 1, 2014

(54) METHOD AND SYSTEM FOR OPTICAL ALIGNMENTS FOR THREE-DIMENSIONAL (3D) PROJECTION

(75) Inventor: William Gibbens Redmann, Glendale, CA (US)

(73) Assignee: Thomson Licensing, Issy les Moulineaux (FR)

( * ) Notice: Subject to any disclaimer, the term of this patent is extended or adjusted under 35 U.S.C. 154(b) by 693 days.

(21) Appl. No.: 12/885,078

(22) Filed: Sep. 17, 2010

(65) Prior Publication Data

US 2011/0069281 A1 Mar. 24, 2011

Related U.S. Application Data

(60) Provisional application No. 61/244,003, filed on Sep. 18, 2009.

(51) Int. Cl.
*G03B 21/00* (2006.01)

(52) U.S. Cl.
USPC .............................................. 353/7; 353/121

(58) Field of Classification Search
USPC ............ 348/42, 43, 51, 52, 54; 359/462, 466, 359/475, 477; 353/6–9, 30, 31, 69, 70, 121
See application file for complete search history.

(56) References Cited

U.S. PATENT DOCUMENTS

| | | | |
|---|---|---|---|
| 4,464,028 A | 8/1984 | Condon | |
| 4,823,187 A | 4/1989 | Toyama et al. | |
| 4,999,703 A | 3/1991 | Henderson | |
| 5,481,321 A | 1/1996 | Lipton | |
| 5,537,144 A | * 7/1996 | Faris | 348/58 |
| 5,956,000 A | 9/1999 | Kreitman et al. | |
| 6,281,951 B1 | 8/2001 | Carpentier et al. | |
| 7,209,225 B2 | 4/2007 | Inoue | |

FOREIGN PATENT DOCUMENTS

| | | |
|---|---|---|
| CN | 1228662 | 9/1999 |
| CN | 1833156 | 9/2006 |

OTHER PUBLICATIONS

Paramount Pictures Corporation: 3-D Projection system instruction manual (publication date unknown). http://www.film-tech.com/warehouse/wareview.php?id=804&category=2.
SMPTE RP 40 and 35 PA Test Films 1995.
Condon et al.: Principles of Quality 3D motion picture projection, Stereovision International, Inc. 1983, http://www.film-tech.com/warehouse/wareview.php?id=817&category=2.
Instructions for Use of "Above/Below" Type Stereo Vision 3D Lens Projection System, Sterovision International, Inc. 1981. http://www.film-tech.com/warehouse/wareview.php?id=816&category=2.
ISCO Optic: Instruction Manual for Stereovision-3D from ISCO-Optic GmbH, Gottingen, Germany (publication date unknown).
Spagno et al.: "Construction of Three-Sided Immersive Telecollaboration System", Proceedings of the IEEE Virtual Reality 2003 (VR'03). IEEE Cop. Sol, US, Mar. 22, 2003, p. 37-44.

\* cited by examiner

*Primary Examiner* — Pascal M Bui Pho
(74) *Attorney, Agent, or Firm* — Robert D. Shedd; Wan Yee Cheung

(57) ABSTRACT

Orientation, convergence, and brightness balance corrections for a stereoscopic projection system are achieved by employing a novel test pattern in a low-cost alignment method to allow accurate, rapid alignment of the illuminator, film, and stereoscopic lens. The method and test pattern are also applicable for aligning a dual projector system, in which two projectors are used for projecting right- and left-eye images, respectively.

15 Claims, 14 Drawing Sheets

METHOD AND SYSTEM FOR OPTICAL ALIGNMENTS FOR THREE-DIMENSIONAL (3D) PROJECTION

CROSS-REFERENCE TO RELATED APPLICATION

The present application for patent claims the benefit of priority from U.S. Provisional Patent Application Ser. No. 61/244,003, "Method and System for Optical Alignments for Three-Dimensional (3D) Projection" filed on Sep. 18, 2009. The teachings of the above-identified provisional patent application are expressly incorporated herein by reference in its entirety.

TECHNICAL FIELD

The present invention relates to stereoscopic projection systems and, more particularly, to the alignment of such systems and the correction of alignment errors related to orientation, convergence, and brightness balance in a dual-lens stereoscopic 3D projection system.

BACKGROUND OF THE INVENTION

The current wave of three-dimensional (3D) films is gaining popularity, which is made possible by the ease of use of digital technology and especially 3D digital cinema projection systems. However, the availability of new 3D digital cinema projection systems has been inadequate to keep pace with demand the demand for the new systems. Moreover, theater owners are finding that the changeover to the 3D digital cinema projection systems is very expensive business proposition. As a result, there is currently a move to satisfy the demand for 3D films without the use of digital technology by deploying stereoscopic film prints for presentation using a stereoscopic 3D projector.

Earlier 3D film systems were and continue to be considerably less expensive than the digital cinema approach. However, the earlier film systems experienced difficulties relating to configuration, brightness, and discoloration of the picture, among others. If improvements could be found in a film-based 3D presentation system for the image separation, color, and brightness of the 3D images and if those potential solutions could compete with, if not exceed, the related characteristics in the digital cinema presentations, then it would be possible to present a 3D film based product with sufficiently high quality to attract audiences to the same degree that digital cinema 3D attract audiences today.

However, in these prior film-based 3D systems, movement of the lens or projector lamp or other illuminator components can result in a change in the alignment of the system. When the system alignment is changed, a gross differential brightness of the projected right- and left-eye images occurs along with vertical and horizontal alignment errors. These alignment or brightness balance errors, depending on their respective degree, can result in severe eye fatigue and a potentially unpleasant viewing experience for the audience.

Back in the 1980's, a wave of 3D films were shown in the US and elsewhere, making use of a lens and filter described by Condon in U.S. Pat. No. 4,464,028, which is expressly incorporated by reference in its entirety. Horizontal and vertical alignment were achieved with varying degrees of success by projecting a film having substantially the same image as each image of the stereoscopic pair, and using the projected image as a visual aid to adjust the system for proper alignment. But little, if anything, was done to adjust and correct the differential brightness due to misalignment because this condition is difficult to view from the projection booth due to a hot spot formed on a high-gain silver screen.

As a result, the known prior methods and apparatus appear to lack any suitable solutions for overcoming the problems related to orientation, convergence and brightness balance in 3D film-based projection systems.

SUMMARY OF THE INVENTION

Orientation, convergence, and brightness balance corrections for a 3D dual-lens projection system are achieved in accordance with the principles of the present invention by employing a novel test pattern in a low-cost alignment method to allow accurate, rapid alignment among the illuminator, right- and left-eye images of a film, and a stereoscopic lens. The method and test pattern are also applicable for aligning a dual projector system, in which two projectors are used for projecting right- and left-eye images, respectively.

One aspect of the invention relates to a test pattern for use in aligning a stereoscopic projection system. The test pattern includes a first image and a second image forming a stereoscopic image pair, the first image having a first pattern that includes a first plurality of adjacent light and dark regions, the second image having a second pattern that includes a second plurality of adjacent light and dark regions, in which the second pattern is a conjugate of the first pattern with respect to positioning of the respective pluralities of adjacent light and dark regions. A combination of first and second images projected by the stereoscopic projection system can be used to indicate at least one of: orientation, convergence and brightness balance errors in the stereoscopic projection system.

Another aspect of the invention relates to a method for aligning a stereoscopic projection system. The method includes projecting a first image and a second image forming a stereoscopic image pair, the first image having a first pattern that includes a first plurality of adjacent light and dark regions, the second image having a second pattern that includes a second plurality of adjacent light and dark regions, and the second pattern is a conjugate of the first pattern with respect to positioning of the respective pluralities of adjacent light and dark regions. The method further includes: adjusting orientation of a stereoscopic lens in response to presence of substantially vertical interface regions between the projected first and second patterns, the substantially vertical interface regions exhibiting light and dark patterns indicative of a horizontal offset between the projected first and second images; adjusting convergence of the stereoscopic lens in response to presence of substantially horizontal interface regions between the projected first and second patterns, the substantially horizontal interface regions exhibiting light and dark pattern indicative of a vertical offset between the projected first and second images; and adjusting brightness balance of the stereoscopic projection system in response to presence of adjacent light and dark regions in a projected pattern substantially similar to at least one of the first and second patterns.

Yet another aspect of the invention relates to a method for aligning a stereoscopic projection system, the method includes: projecting a first image and a second image forming a stereoscopic image pair, the first image having a first pattern that includes a first plurality of adjacent light and dark regions, the second image having a second pattern that includes a second plurality of adjacent light and dark regions, in which the second pattern is a conjugate of the first pattern with respect to positioning of the respective pluralities of adjacent light and dark regions. The method also includes correcting an error related to at least one of orientation and convergence for the stereoscopic projection system by performing at least one of steps (a) and (b), in which: step (a) includes adjusting orientation of a stereoscopic lens in response to presence of substantially vertical interface regions related to a horizontal offset between the first and second projected images, the substantially vertical interface regions exhibiting a light and dark pattern indicative of the horizontal offset; and step (b) includes adjusting convergence of the stereoscopic lens in response to presence of substantially horizontal interface regions related to a vertical offset between the first and second projected images, the substantially horizontal interface regions exhibiting a light and dark pattern indicative of the vertical offset. The method further includes adjusting brightness balance of the stereoscopic projection system in response to presence of adjacent light and dark regions in a projected pattern substantially similar to at least one of the first and second patterns.

The details of one or more implementations are set forth in the accompanying drawings and the description below. Even if described in one particular manner, it should be clear that implementations may be configured or embodied in various manners. For example, an implementation may be performed as a method, or embodied as an apparatus configured to perform a set of operations, or embodied as an apparatus storing instructions for performing a set of operations. Other aspects and features will become apparent from the following detailed description considered in conjunction with the accompanying drawings and the claims.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

The exemplary embodiments set out herein illustrate preferred embodiments of the invention, and such exemplary embodiments are not to be construed as limiting the scope of the invention in any manner.

DETAILED DESCRIPTION

The present invention applies to a standard film projector outfitted with a dual (i.e., stereoscopic) lens system to project each of two images of a stereoscopic pair at the same time: one image for the left eye, and one image for the right eye. A filter inline with each of the left- and right-eye halves of the dual lens encodes the corresponding left- and right-eye images of a stereoscopic pair so that, when projected on a screen, audience members wearing glasses with filters corresponding to those of the dual lens system and properly oriented, will perceive the left-eye image in their left eyes, and the right-eye image in their right eyes. The present invention is also applicable to many special-venue systems for presenting 3D films that use two synchronized projectors (one for the images of each eye).

Figure 1:
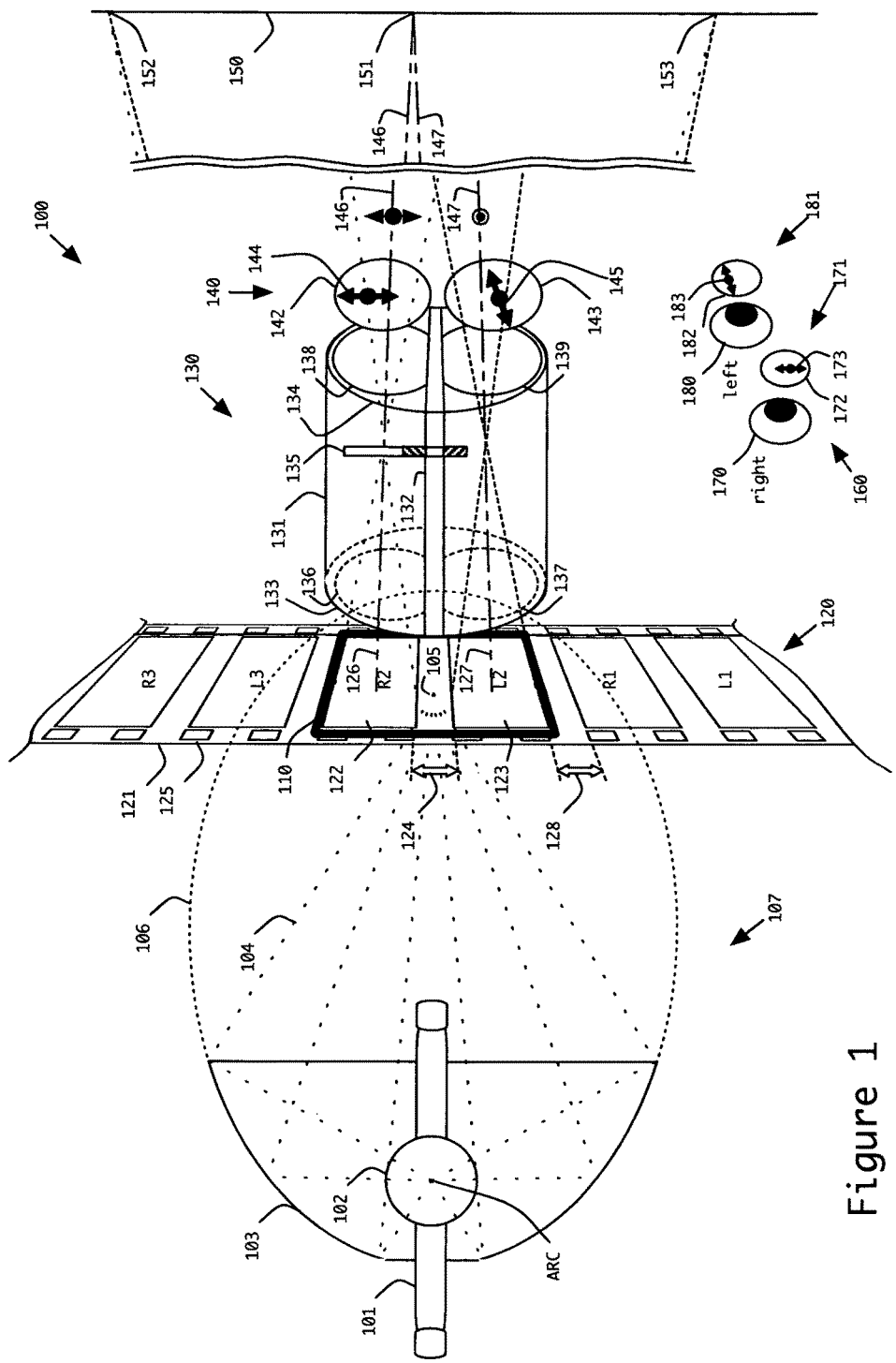
FIG. 1 is a diagram of some major elements of a film projector with a dual lens system and polarizers for showing stereoscopic film.

FIG. 1 shows an over-under lens 3D film projection system 100, also called a dual-lens 3D film projection system or projector. Rectangular left-eye image 122 and rectangular right-eye image 123, both on 3D film 120, are simultaneously illuminated by a light source and condenser optics, collectively called illuminator 107, which is located behind the film while framed by aperture plate 110 such that all other images on film 120 are not visible because these images are covered or otherwise obscured by the opaque portion of the aperture plate. It will be apparent to persons skilled in this art that only the inner edge of the aperture is illustrated in this figure for clarity purposes. The left- and right-eye images, which together form a stereoscopic image pair and are visible through aperture plate 110, are projected by over-under lens system 130 onto screen 150 where the images are generally aligned and superimposed on each other such that the tops of both projected images are aligned at the top edge 152 of the screen viewing area, and the bottoms of the projected images are aligned at the bottom edge 153 of the screen viewing area.

Film projector 100, which is depicted not to scale, includes an illuminator 107 in this embodiment comprising a high intensity lamp such as arc lamp 101 having envelope 102 at the center of which is a luminous arc. Reflector 103 is shown in this exemplary embodiment as elliptically shaped to follow substantially an ellipse 106 for reflecting light rays 104 from the luminous arc near the first focal point of ellipse 106 to form an image 105 of the arc near the second focal point of ellipse 106. For most film projectors, image 105 of the luminous arc is formed at or near the film gate, which is shown here as aperture 110 cut into an aperture plate. Aperture 110 is depicted in FIG. 1 as an opening for which only the boundary of the opening in the aperture plate is shown for clarity. In this way, the illumination from the luminous arc is provided as a smooth field, providing adequate illumination over the entirety of the opening for aperture 110.

Stereoscopic film 120 comprises film substrate 121 having a row of perforations 125 along each edge. The perforations allow for engagement by a sprocket or other such mechanism to advance the film smoothly and continuously from one image to the next. As mentioned above, the images on film 120 are grouped in pairs of left and right images. Stereoscopic image pairs (R1, L1), (R2, L2), and (R3, L3) as shown in FIG. 1 are adjacent images provided along film 120. For example, the stereoscopic image pair including images R2 and L2 corresponds to a right-eye image 122 and left-eye image 123, respectively. Both images forming a stereoscopic image pair are simultaneously illuminated while within the opening formed by aperture 110. Images in the same stereoscopic pair such as images 122 (R2) and 123 (L2) are separated from each other by a gap defined as intra-frame gap 124. Consecutive stereoscopic image pairs, or two adjacent images (e.g., left- and right-eye images) belonging to different stereoscopic image pairs, are separated from each other by a gap defined as inter-frame gap 128. Inter-frame gap 128 may or may not exhibit the same dimensions as intra-frame gap 124. Due to the inverting nature of the projector system 100, the images on the film are provided in the projector in an inverted manner such that each image will be shown in its upright orientation when projected on the screen.

Lens system 130 comprises lens body 131 having an entrance end 133 and an exit end 134. Entrance end 133 faces film 120 and exit end 134 faces screen 150. In this embodiment, lens system 130 is a stereoscopic dual lens having an upper portion for projecting right-eye images and a lower portion for projecting left-eye images. The upper portion of lens system 130 includes entrance lens element 136 on the film side and exit lens element 138 on the screen side. The lower portion of the lens system includes entrance lens element 137 on the film side and exit lens element 139 on the screen side. Upper and lower portions of lens system 130 are separated by gap 132. Gap 132 is controllably adjustable by adjustment element 135 to have a variable gap width that can be expanded or contracted. In this embodiment, gap 132 is lined with a coating or the like to prevent leakage of light between the upper and lower portions of the lens system.

Lens system 130 also includes a filter module or assembly 140. Filter assembly 140 can include one or more of any of linear or circular polarizers or other non-polarizing filter elements, such as red/blue filters for anaglyphic 3D or multi-band interference filters, all of which are well known in the art and are suitable for separating the right- and left-eye images so that an audience member 160 can perceive a stereoscopic presentation.

In FIG. 1, a right-eye linear polarizer 142 is shown having a vertically oriented polarization axis 144, and a left-eye linear polarizer 143 is shown having a horizontally oriented polarization axis 145. Light emitted from the illuminator 107 passes through right-eye image 122 as a collection of light rays represented by centerline 126, which is imaged on screen 150 by the upper portion of lens system 130. The portion of light rays transmitted by polarizer 142, which is represented by centerline 146, and incident on screen 150 is polarized substantially parallel to polarization axis 144. In a similar manner, light emitted from the illuminator 107 passes through left-eye image 123 as a collection of light rays represented by centerline 127, which is imaged on screen 150 by the lower portion of lens system 130. The portion of light rays transmitted by polarizer 143, which is represented by centerline 147, and incident on screen 150 is polarized substantially parallel to polarization axis 145.

When properly aligned, the projections of right-eye image 122 and left-eye image 123 are substantially superimposed on screen 150. Both projected images have their respective centers substantially co-located at screen center 151, as represented in FIG. 1 by the convergence of centerlines 146 and 147. Upon projection, the tops of images 122 and 123 are both imaged substantially along top 152 of screen 150, and the bottom of images 122 and 123 are both projected substantially along bottom 153 of screen 150.

When filter module 140 employs polarizing components, such as linear polarizers 142 and 143, screen 150 should exhibit a polarization preserving property. One such polarization preserving screen is a silver screen. On the other hand, when filter module 140 does not employ any polarizing components, screen 150 may be realized without the need for a polarization preserving property.

Audience member 160 is provided with 3D glasses with a right-eye portion 171 and a left-eye portion 181. Since polarization elements are used in the exemplary lens system in FIG. 1, the 3D glasses include right-eye portion 171 comprising a linear polarizer 172 having an axis of polarization 173 in a first direction, and left-eye portion 181 comprising a linear polarizer 182 having an axis of polarization 183 in a second direction that is orthogonal to the first direction for polarization axis 173. In other embodiments where circularly polarization elements are employed in the lens system—such as where clockwise and counter-clockwise circular polarizations are used—for projecting the respective stereoscopic images, 3D glasses will be provided with corresponding circular polarizers in the two eye portions.

As shown in the exemplary embodiment of FIG. 1, polarization axis 173 is oriented substantially parallel to polarization axis 144 such that the projected right-eye images after reflection from screen 150 pass through right-eye polarizer 172 for viewing by audience member 160. The same reflected light for the projected right-eye images will not pass through left-eye polarizer 182, since polarization axis 144 of the right-eye images is substantially perpendicular to axis 183 in left-eye polarizer 182. Thus, only the projection of right-eye image 122 reaches the right-eye 170 of audience member 160. In a similar manner, only the projection of left-eye image 123 reaches the left-eye 180 of audience member 160 because polarization axis 145 of the left-eye images is substantially perpendicular to axis 173 in right-eye polarizer 172.

An observer, who is not wearing 3D glasses, would see the superposition of both projections of right- and left-eye images 122 and 123 and would be unable to perceive the 3D effect from the superimposed images. This will serve as the primary mode for an operator performing various adjustments prescribed in accordance with the principles of the present invention.

Figure 2:
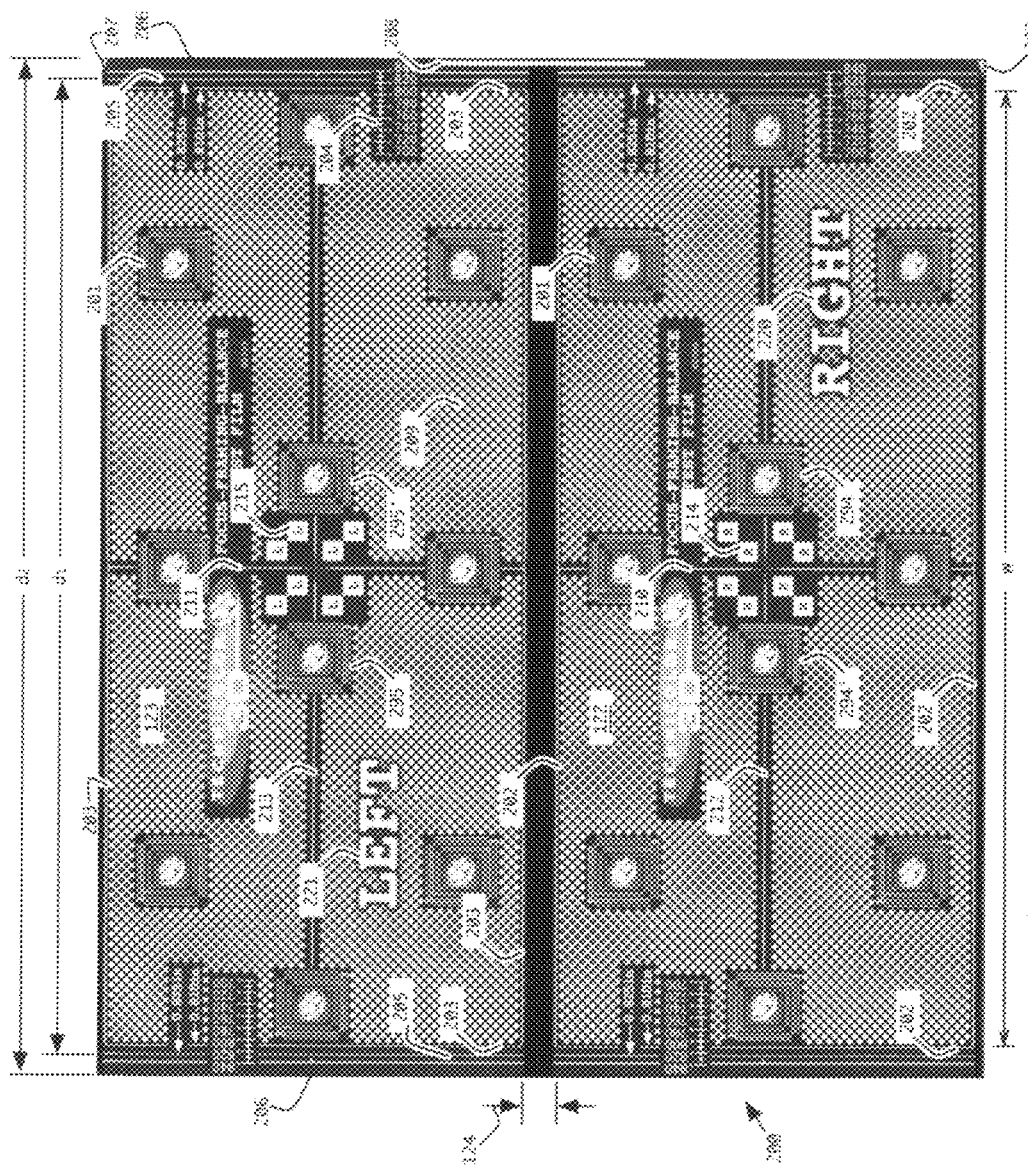
FIG. 2 is a test pattern realized in accordance with the principles of the present invention.

FIG. 2 shows a test pattern 200 realized in accordance with the principles of the present invention. Test pattern 200 is particularly well suited for applications in determining and correcting one or more of the following conditions of the projection system:

whether lens system 130 is properly oriented so that the right- and left-eye images 122, 123, when projected, are in horizontal alignment;

whether lens system 130 is properly converged so that the right- and left-eye images 122, 123, when projected, are in vertical alignment; and whether illuminator 107 is balanced to provide similar levels of illumination for the projection of right- and left-eye images 122, 123.

In a properly oriented lens system, the upper portion of lens system 130 is positioned directly or vertically above the lower portion (i.e., a line joining the center points of lens elements 138 and 139 will be substantially vertical) such that the projected left- and right-eye images will be horizontally aligned without a lateral offset between the images. In a properly converged lens system, upper and lower lens portions will have a vertical separation that results in left- and right-eye images being projected without a vertical offset with respect to each other.

Explicit indicia 220 and 221 ("RIGHT" and "LEFT" labels) assist in the correct identification of right- and left-eye images 122 and 123, respectively. Indicia 220 and 221 are particularly useful for determining whether the polarizer module 140 of the 3D system and the 3D glasses supplied to audience member 160 are compatible and properly installed.

Test pattern 200 comprises right- and left-eye images 122 and 123, which are recorded repeatedly to film 120, which film may then be formed into a looped, to allow a continuous projection of the test pattern images onto screen 150 as the film advances through the 3D projection system during a system evaluation and/or alignment operation. It is necessary to keep the film advancing, as opposed to using a still image, to avoid having the radiant energy from illuminator 107 cause a hole to burn in a static segment of film 120 held still in the gate.

In test pattern 200, right-eye image 122 is bounded by rectangular area 202 and left-eye image 123 is bounded by rectangular area 203. The dimensions of these rectangular areas are selected based on the film format to be projected. In the exemplary embodiment shown in the figures, rectangular areas 202 and 203 represent 0.810" wide images on film 120. Each rectangular area has an aspect ratio of 2.39:1, that is, a "scope" image. Rectangular areas 202 and 203 also denote "safe areas" having a width w, such that, when the projector is properly aligned, rectangular areas 202 and 203, would be clear of theater masking when projected. Theater masking is generally understood to include black curtains that dress the edges of the screen and are not shown in the figures. 3D filmmakers frequently design scenes whose 3D effects will fail when the images come in visual contact with the edge of the projection surface or the masking.

Also shown in test pattern 200 are left and right boundary lines 205 with a separation $d_1$, which corresponds to a maximum horizontal dimension of a 0.825" wide image on the film. This separation $d_1$ represents the expected width of the image in several common 2D film formats, and it also represents a typical maximum amount horizontally of an image to be projected from the film test pattern 200. Depending upon certain conventions that apply during normal film presentation and viewing, the safe area denoted by rectangular areas 202 and 203 corresponds to the image area that must be shown on the screen, whereas the region included within the boundary lines 205 separated by distance $d_1$ may be shown on the screen, and whereas the extending region beyond the extent of the boundaries outside boundary lines 205 should not be shown.

Outer boundary edges 206 of test pattern 200 represent the horizontal extent, which is shown as separation $d_2$, for a corresponding gate aperture of the camera. In an exemplary embodiment, the separation $d_2$ is generally set to be equal to 0.866". Although depicted in gross detail in FIG. 1, the film includes a region that lies beyond outer boundary edges 206. This region includes ancillary film information such as optical sound tracks, digital sound tracks, and time code tracks (not shown), which may be digital, and perforations 125.

As shown in FIG. 1, the consecutive (or adjacent) right- and left-eye images of the same stereoscopic pair are separated by intra-frame gap 124, which appears to be substantially similar to inter-frame gap 128 between consecutive stereoscopic pairs of images. Due to the similarity in appearance between these two different gaps, editing of stereoscopic film can be confusing for an individual tasked with this operation. When stereoscopic film 120 is cut at one intra-frame gap 124, which is a procedural error, and then spliced to another strip of stereoscopic film cut at inter-frame gap 128 during editing, the sequence of alternating left- and right-eye images will be disrupted causing a projected presentation to switch from stereoscopic to pseudoscopic. In a pseudoscopic presentation, the projected right-eye image will be seen by the left eye and the projected left-eye image will be seen by the right eye. In other words, the images will be seen by the wrong eye, which can result in eye strain and discomfort for the viewing audience.

In co-pending U.S. patent application Ser. No. 12/807,882, entitled "Method and System with Indicating Marks for Projection Film" filed on Sep. 16, 2010, which is expressly incorporated herein by reference, tick marks 207 are provided to indicate a region near inter-frame gap 128, where edits or cuts may be made. Warning bar 208 is provided to indicate even more prominently where edits should not be made, namely, at or near an intra-frame gap 124. Both tick marks 207 and warning bars 208 are located outside frame boundary 205. In this way, marks 207 and 208 should be unable to be viewed in any image projected onto screen 150. In addition, because both marks 207 and 208 are provided inside limits 206 and away from the left and right edges of the film 120, these marks are not expected to interfere with reading of ancillary information such as optical soundtracks and the like (not shown) that may be present on the film beyond the outer boundary edges 206.

In FIG. 2, one-half of inter-frame gap 128 and one-half of tick mark 207 are shown at both the top and bottom edges of test pattern 200 such that, when test pattern 200 is recorded repeatedly onto film 120, the halves of inter-frame gap 128 and tick mark 207 would merge to form a complete inter-frame gap 128 and a complete tick mark 207. Marks 207 and 208 may have different shapes, designs, patterns, or colors. For example, they may be presented as blank or bright marks against a dark background to facilitate visual identification and inspection. In one exemplary embodiment shown in FIG. 2, marks 207 are provided in the form of a triangle or arrow shape, and marks 208 are provided in the form of a bar or elongated strip, so that the two marks are essentially orthogonal to each other.

Multiple focus targets 201, centered-image width reticules 204, and background grid 209 are also provided on test pattern 200. Similar elements are found in standard 2D test patterns such as SMPTE RP40 and 35PA from the Society of Motion Picture and Television Engineers.

Focus targets 201 are positioned near the center of each of right- and left-eye images 122 and 123, and around their top, bottom, and side edges. When projected, these focus targets allow a precise determination of focus throughout all regions of the screen. As shown, focus targets 201 are drawn in 3, 2, and 1 pixel widths for output using a digital film recorder set for a 2048 pixel wide output. In an alternative embodiment, a test pattern generated either by photographically reducing a higher resolution artwork or by a film recorder set for a greater pixel count may be calibrated in line-pairs per inch or in another similar metric.

In an alternate exemplary embodiment, central focus targets 294, 294', 295, 295' may be provided differently from the embodiment shown in FIG. 2. Central focus targets 294, 294', 295, 295' can exhibit patterns different from each other and in part different from focus targets 201. In particular, rather than being identical in each of right- and left-eye images 122 and 123, other-eye focus targets 294' and 295' can be replaced by a black field (not shown). In this way, same-eye focus targets 294 and 295 would be the only focus targets projected in right- and left-eye images, respectively. In this embodiment, valuable for those cases where the upper and lower halves of lens system 130 can be separately focused, a projectionist without the benefit of wearing 3D glasses can independently assess both the focus of the left-eye image 123 by observing the projection of central left-eye focus target 295 (near left-eye indicia 221 which can also serve as the mnemonic for Left Eye Focus Target thereby identifying the eye to which target 295 pertains), and the focus of the right-eye image 122 by observing the projection of central right-eye focus target 294 (near right-eye indicia 220 which can serve as a further aid in identifying the eye to which target 294 pertains). The same technique of blacking out portions of the right- or left-eye images 122 or 123, respectively, can be used elsewhere within the test pattern 200 to allow a more critical viewing of selected indicia, reticules, or regions in the other-eye image.

Image-width reticules 204, which are located at either side of right and left images 122 and 123, establish a scale that may be used for determining the degree to which the scale of projection or the masking position may be out of calibration such as where alignment is not yet ideal. Reticules 204 may also be used when cutting or filing an aperture plate to adjust the size of projector aperture 110. Alignment is considered ideal when the masking falls between the 0.825" projection aperture 205 edges and either of the projected rectangles 202 or 203.

Background grid 209 is identical in each of right- and left-eye images 122 and 123. While grid 209 may be used in evaluating focus and gross alignment throughout the projected image, the primary value of such a grid is to reduce the radiant energy flowing through lens 130 and polarizer module 140. This energy reduction is estimated at approximately a 50% reduction. Since test pattern 200 can be shown in projection system 100 for an extended period of time, grid 209 or other similar designs suitable for reducing the transmitted radiant energy mitigate potential damage to the elements of projection system 100 as a result of the heat due to extended exposure to the high intensity light from illuminator 107.

Right-eye image 122 includes vertical centerline 210 and horizontal centerline 212. Similarly, left-eye image 123 includes vertical centerline 211 and horizontal centerline 213. When the two images are simultaneously projected onto the screen, these centerlines are used to give a visual indication as to whether the orientation and convergence of lens system 130 are correctly set, at least on a coarse scale. However, improved sensitivity for setting and even confirming fine scale adjustments for the orientation and convergence of lens 130 is desired in presenting 3D images. Additionally, improvements for determining and setting the balance of illumination between the right- and left-eye images are also desired in these presentations.

Orientation, convergence, and brightness balance all affect the viewing experience in 3D film presentations. The needs for improvements related to orientation, convergence, and brightness balance are all satisfied by the addition and use of two new patterns in test pattern 200. The new patterns comprise "opposed" or "opposing" checkerboard patterns 214 and 215 located at the center portions of images 122 and 123, respectively. Pattern details in these patterns 214 and 215 are arranged in different orientations or directions. In the exemplary embodiment shown in the figures, these two patterns are conjugates or complements of each other with respect to the actual checkerboard layouts and shading.

When test pattern 200 is projected from a properly converged, oriented, and balanced projector 100, the two checkerboard patterns 214 and 215 overlap exactly so that the light or bright squares of checkerboard pattern 214 from right-eye image 122 are combined on screen 150 with the darker squares of checkerboard pattern 215 from left-eye image 123, and vice versa. When perfectly aligned, the interlacing of the two opposed checkerboard patterns 214 and 215 form a continuous gray field on the screen, as discussed further in conjunction with FIG. 6. On the other hand, any misalignments or incorrect adjustments for brightness balance produce various bright and dark artifacts so that a checkerboard pattern remains visible on the screen, with the edges of squares in the checkerboards remaining visible, as discussed in detail with respect to the various FIGS. 3-5. These results cannot be produced and corresponding benefit is not present from the use of background grid 209, because the checkerboard patterns in grid 209 are identical between each of the right- and left-eye images 122 and 123 so that, when projected by an aligned projector, they still produce the same back and white checkerboard pattern shown in either one of the grids.

Figure 3A:
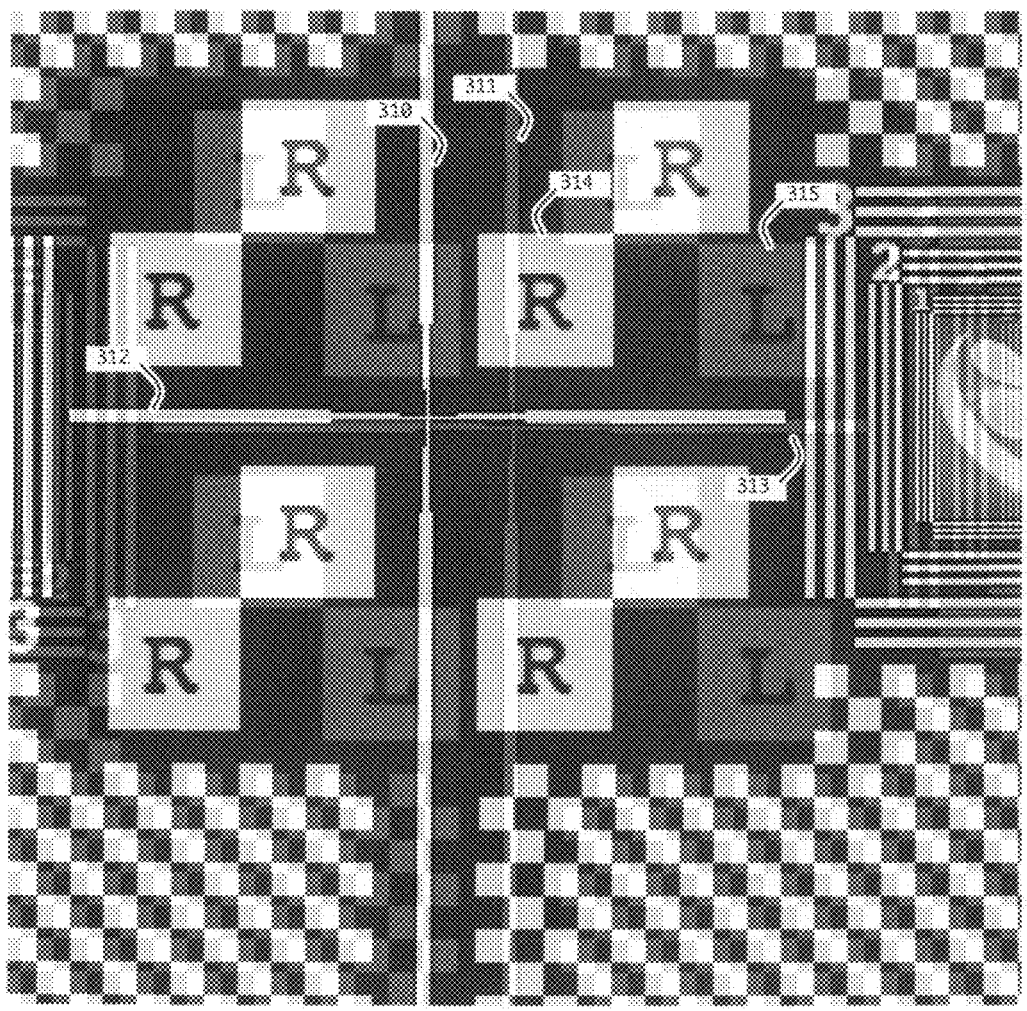
FIG. 3A is a close up of a center portion of the projection of the right- and left-eye images of the test pattern in FIG. 2 as viewed without 3D glasses, but with dual lens mis-orientation, dual lens mis-convergence, and brightness imbalance to be corrected.
Figure 3B:
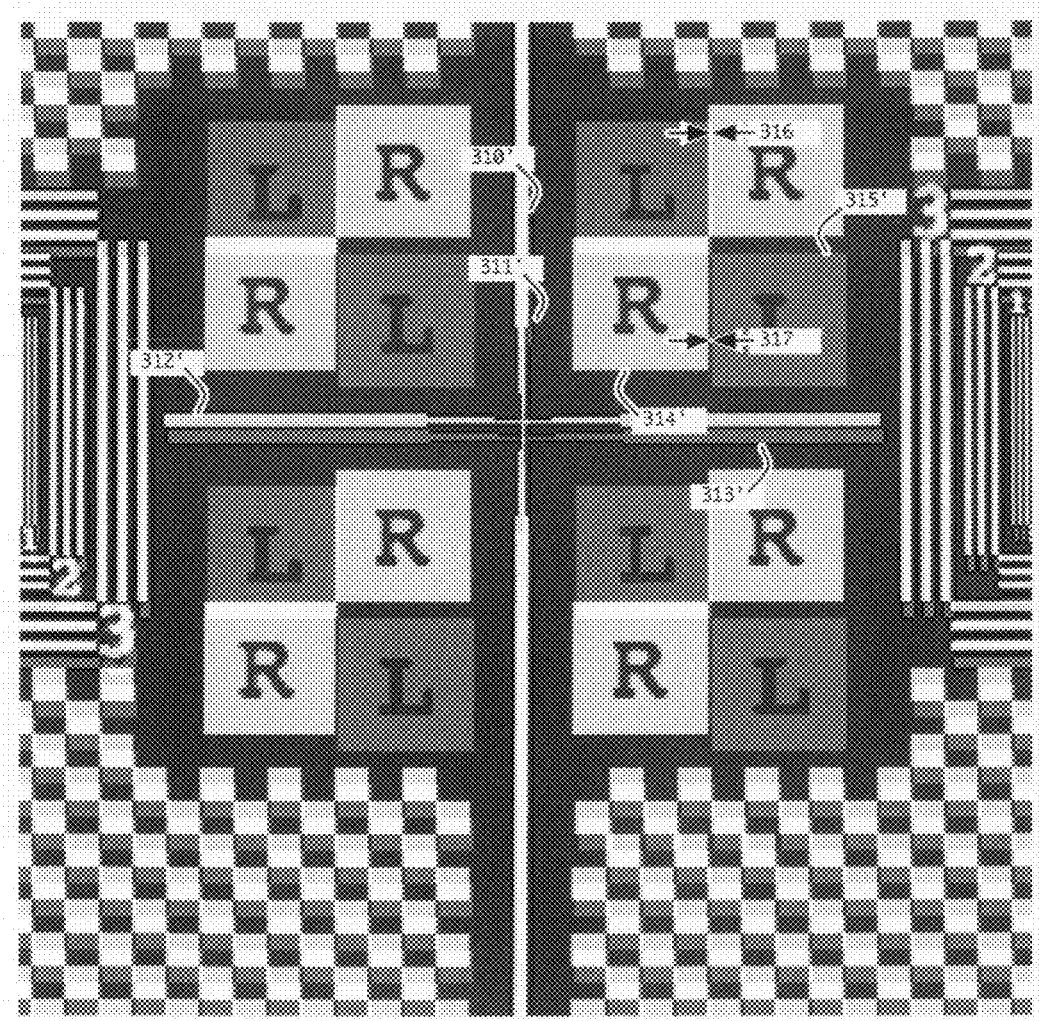
FIG. 3B is a close up of a center portion of the projection of the right- and left-eye images of the test pattern in FIG. 2 as viewed without 3D glasses, with a slight dual lens mis-orientation, but with mis-convergence and imbalance as in FIG. 3A.
Figure 5A:
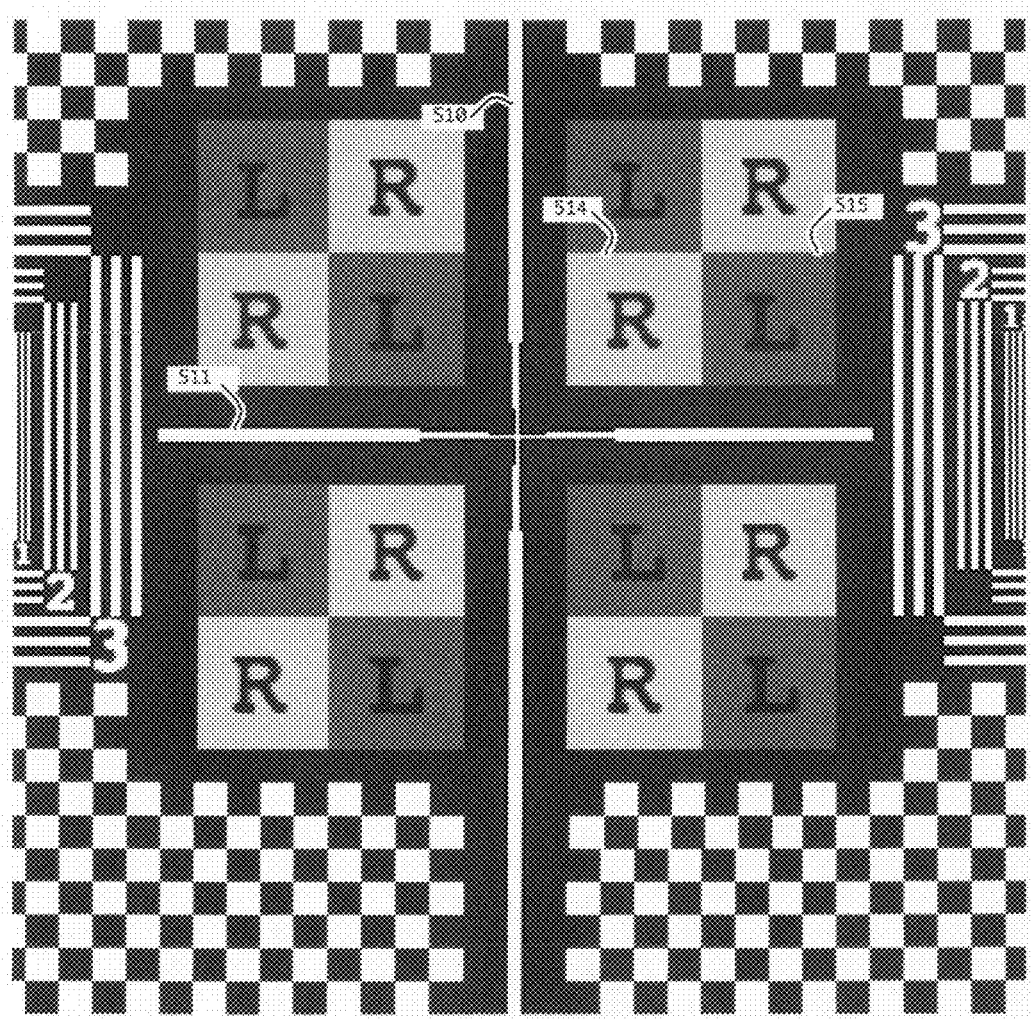
FIG. 5A is a close up of a center portion of the projection of the right- and left-eye images of the test pattern in FIG. 2 as viewed without 3D glasses, but with brightness imbalance to be corrected.
Figure 5B:
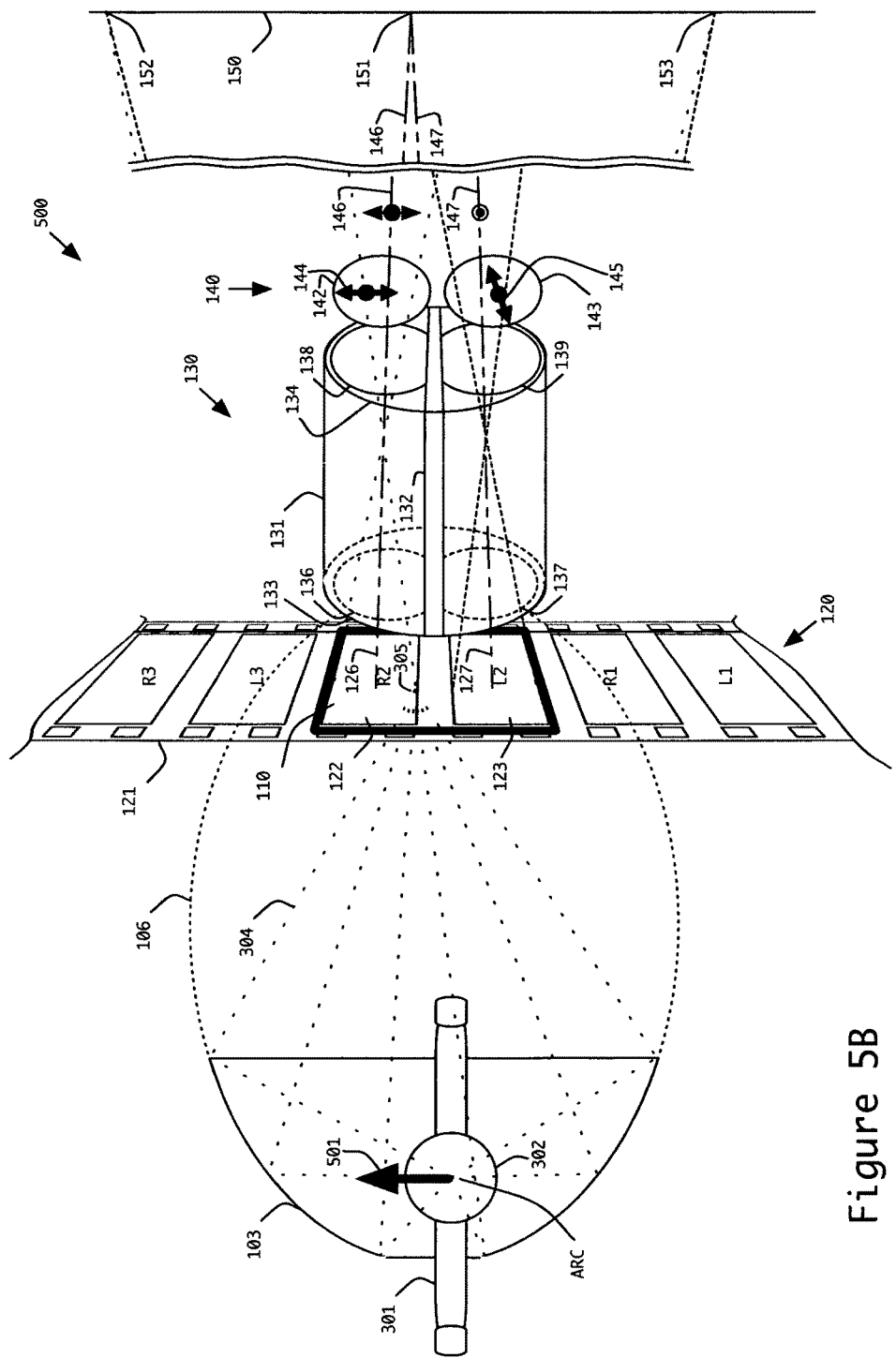
FIG. 5B is an illustration of the corrective action to be taken for the brightness imbalance.
Figure 5C:
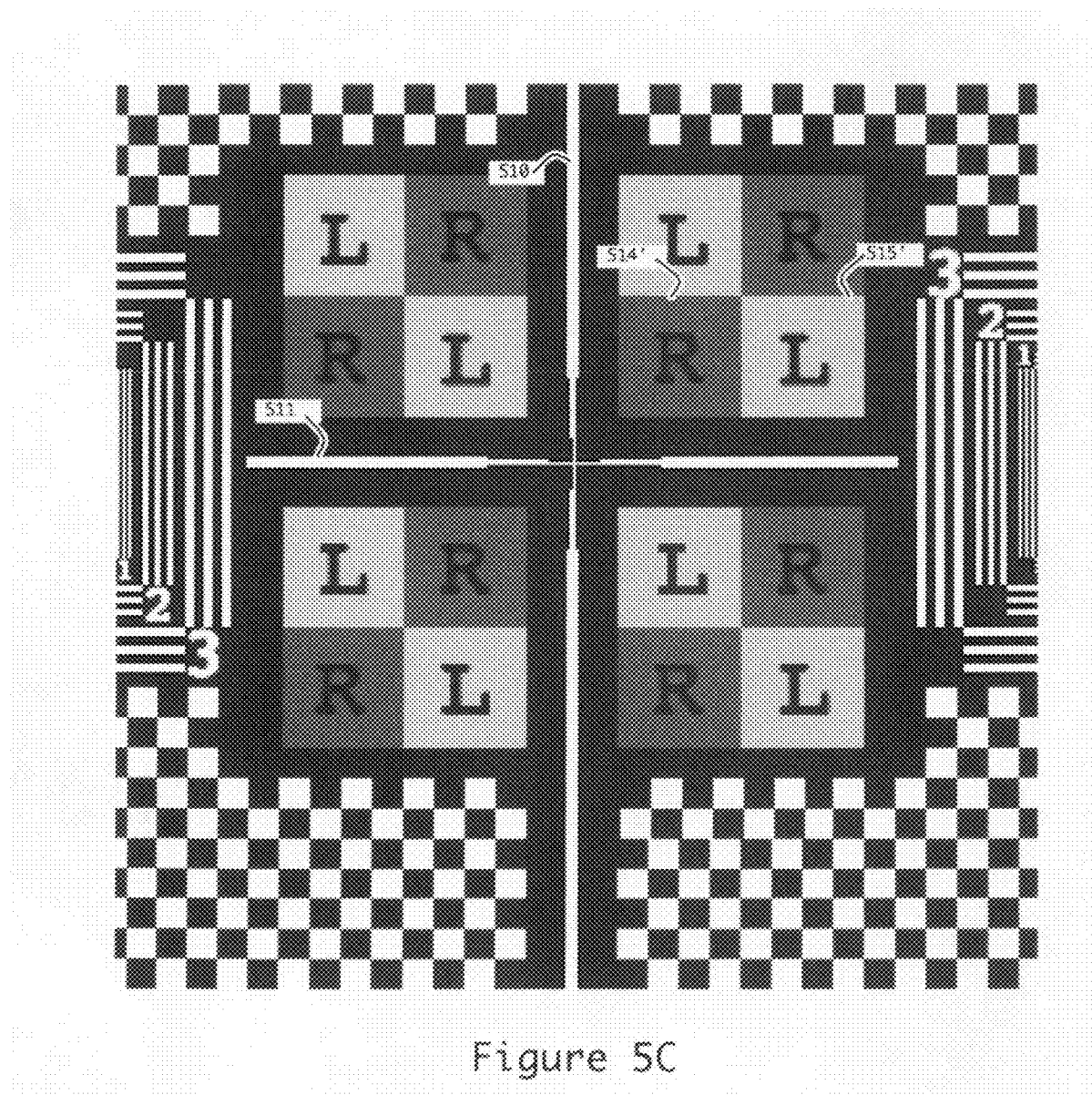
FIG. 5C is a close up of a center portion of the projection of the right- and left-eye images of the test pattern in FIG. 2 as viewed without 3D glasses, but with brightness imbalance of FIG. 5A over-corrected.
Figure 6:
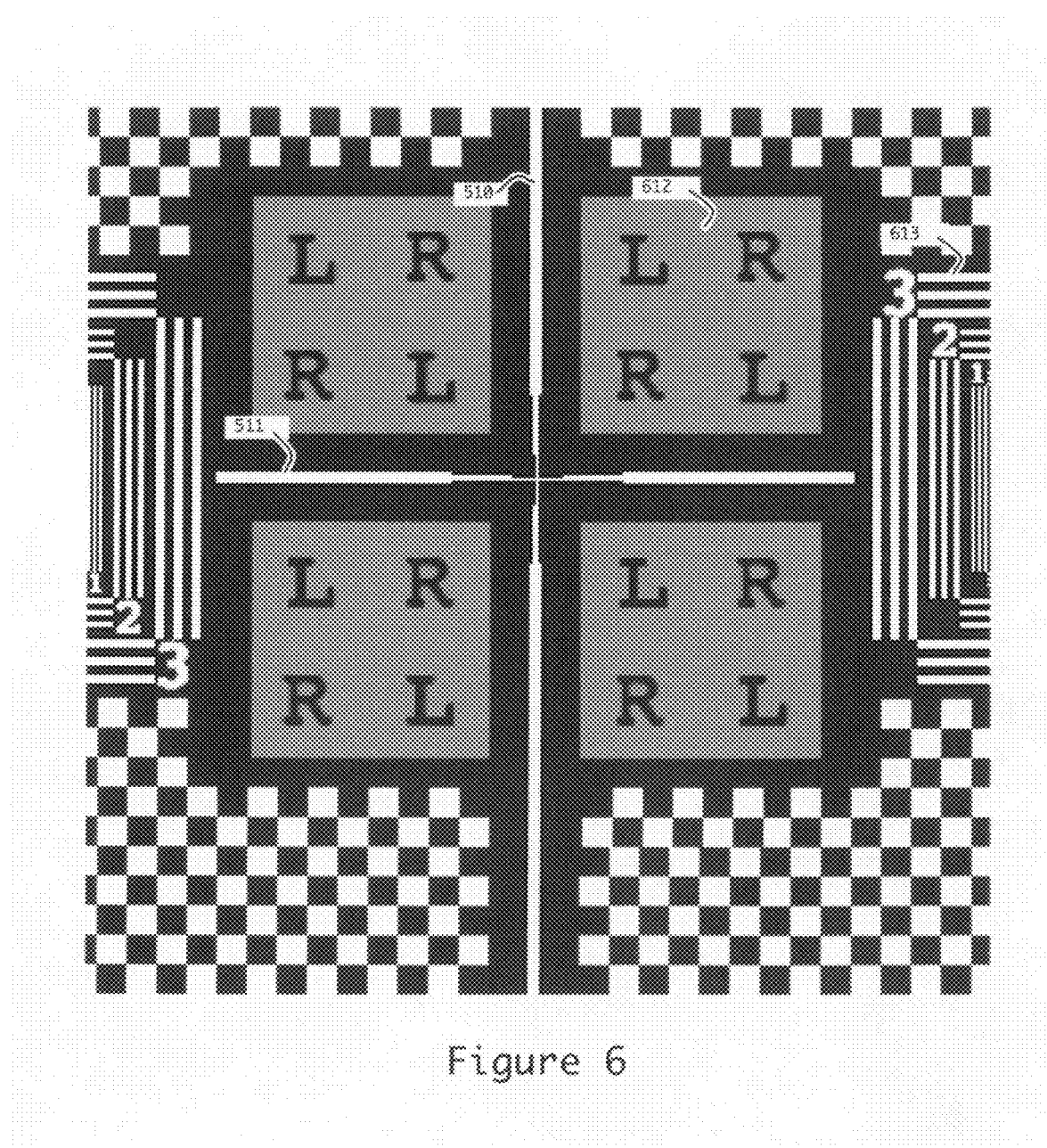
FIG. 6 is a close up of a center portion of the projection of the right- and left-eye images of the test pattern in FIG. 2 as viewed without 3D glasses, properly aligned and balanced.
Figure 7:
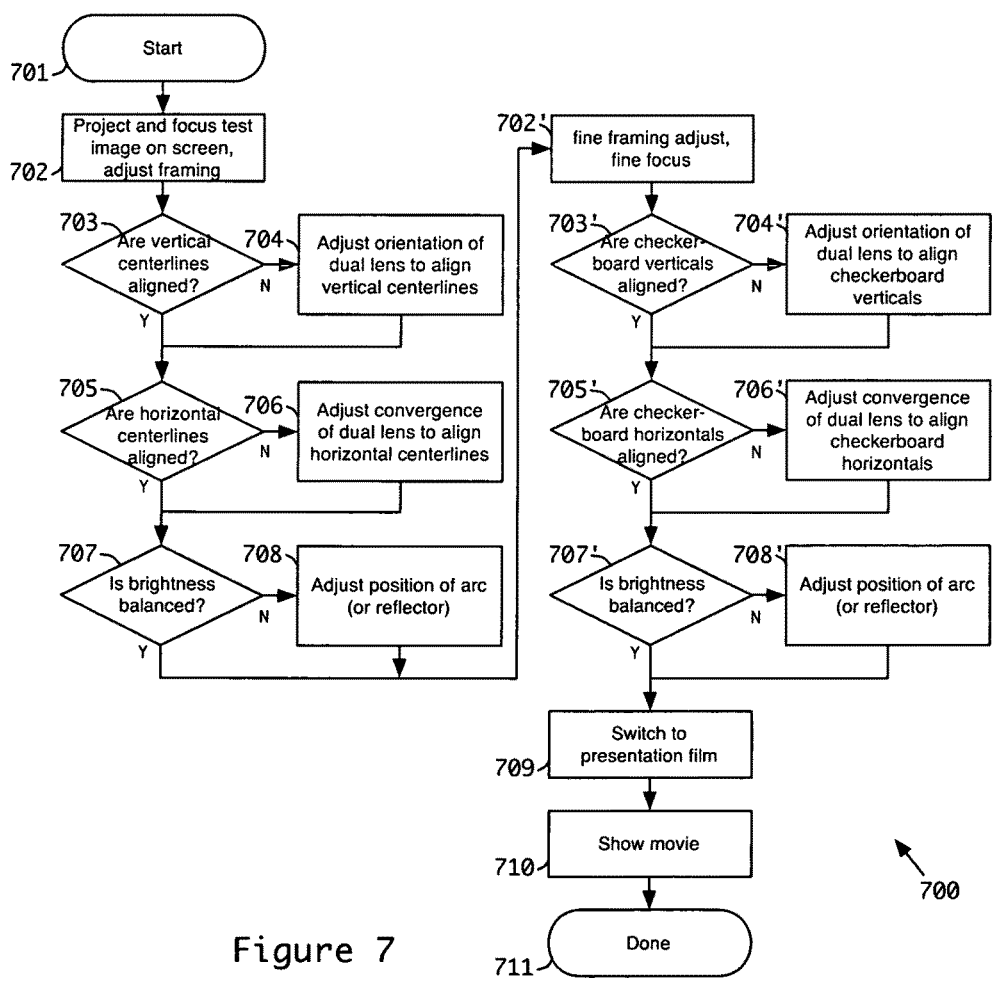
FIG. 7 is a flowchart for one embodiment of an exemplary method of correcting dual lens mis-orientation, mis-convergence, and stereoscopic brightness imbalance.

An exemplary calibration method 700 for adjusting projector 100 and lens 130 for optimal presentation in 3D is shown in the flowchart of FIG. 7. Each step of this method is discussed in a usable order below, with reference to projections of test pattern 200 that would be observed on screen 150 by a technician (not shown) adjusting projector 100 without wearing 3D glasses. A number of potential visible screen patterns, resulting from the projection of the test patterns and indicating a need for some projector and/or lens adjustment, are shown in FIGS. 3A, 3B, 4A, 4B, 5A, 5C and 6. These will be discussed below in the context of calibration method 700. Adjustments to be made in the execution of calibration method 700 to projector 100 or lens 130 are shown in FIGS. 3C, 4C, and 5B.

Figure 3C:
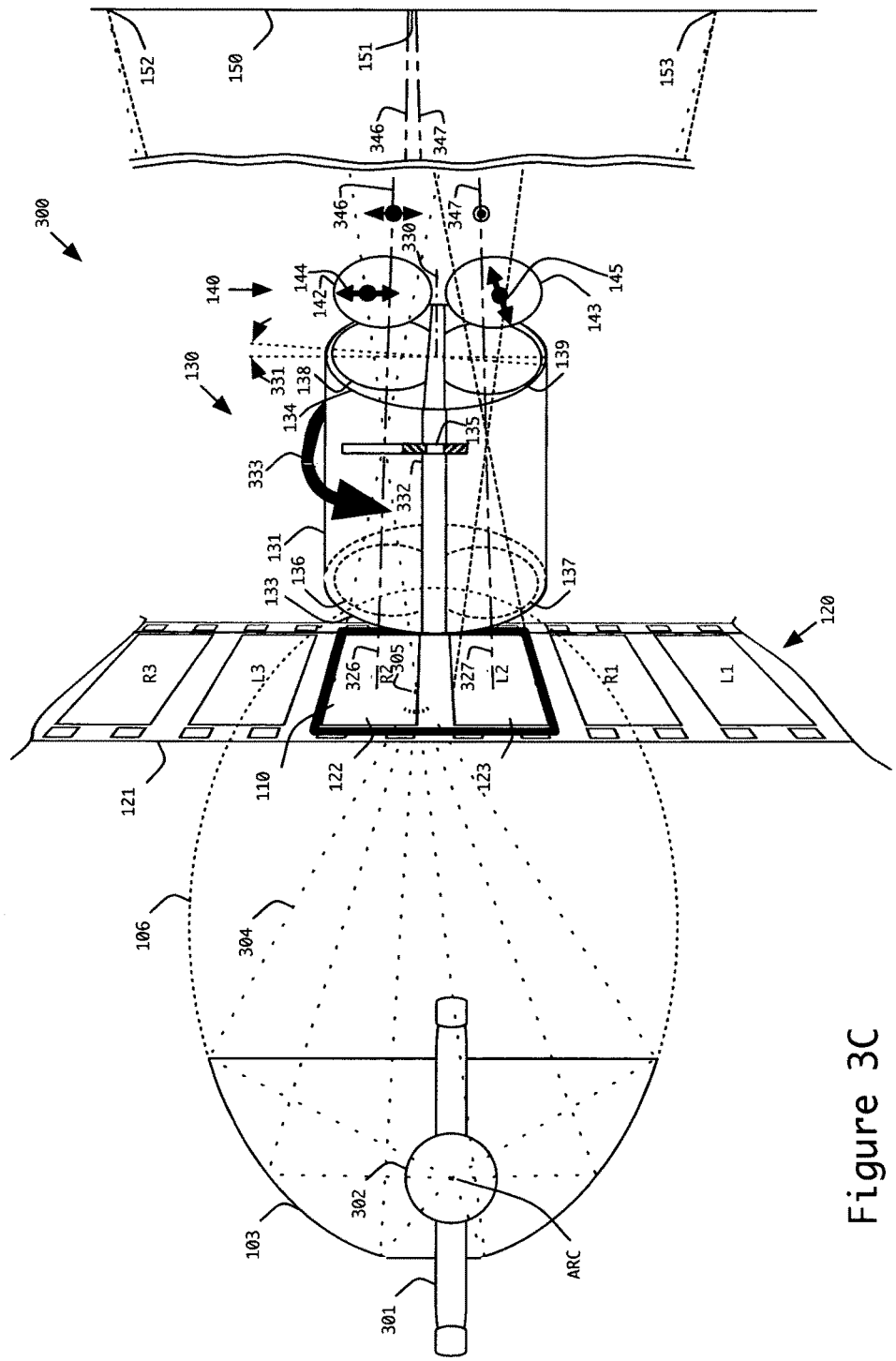
FIG. 3C is an illustration of the corrective action to be taken for the dual lens mis-orientation of FIGS. 3A and 3B.
Figure 4A:
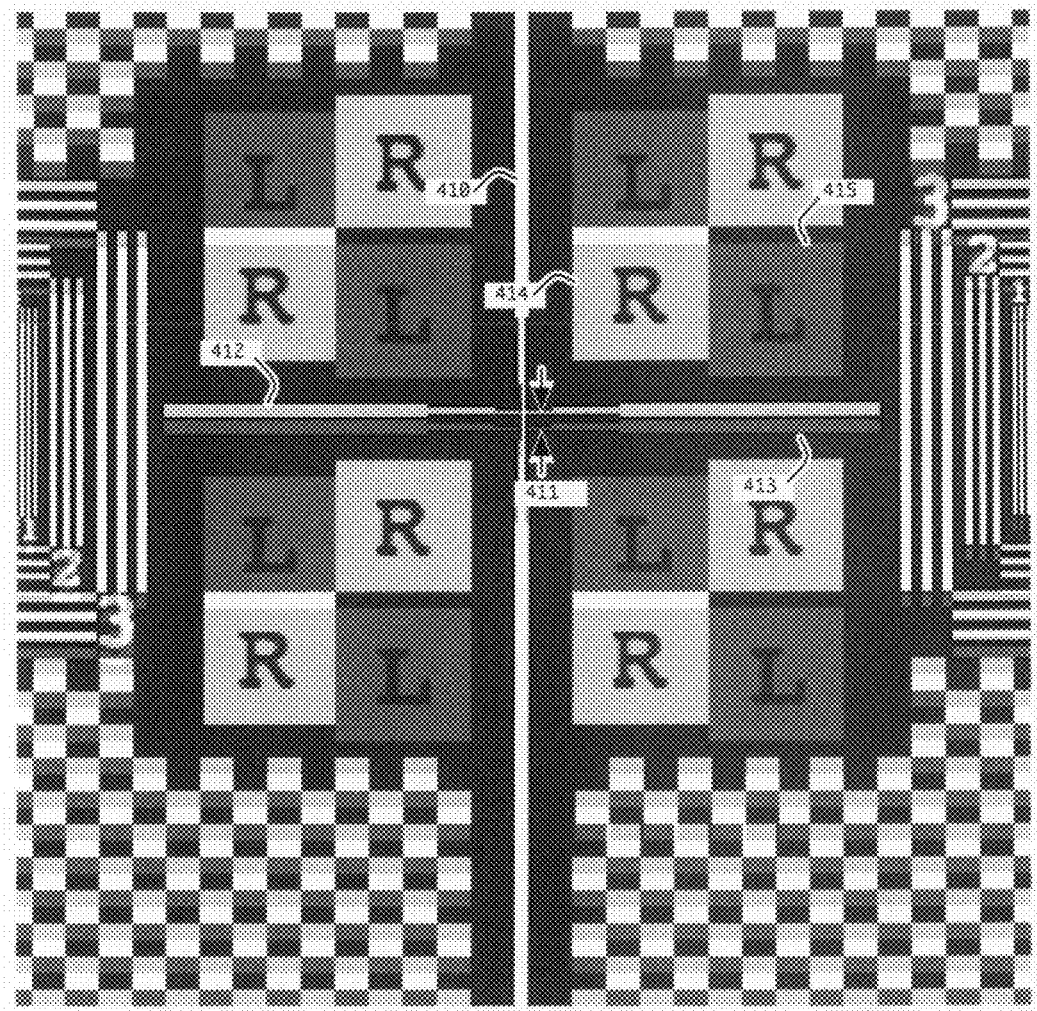
FIG. 4A is a close up of a center portion of the projection of the right- and left-eye images of the test pattern in FIG. 2 as viewed without 3D glasses, but with dual lens mis-convergence and brightness imbalance to be corrected.

For the purposes of the following discussion, projection system 300 of FIG. 3C is shown as having several incorrect adjustments or alignments and therefore being in need of calibration. These incorrect adjustments or alignments result in corresponding errors that can be detected and corrected by one or more aspects of the invention. First, arc lamp 301 is not centered with respect to reflector 103. This results in generation of envelope 302, having an arc near its center, that produces rays 304 forming image 305 of the arc that ultimately is not centered in aperture 110. In this case, image 305 is formed closer to the right-eye image 122, resulting in the projection of the right-eye image being brighter than the projection of left-eye image, as shown in FIGS. 3A, 3B, 4A, 4B, and 5A, in which the right-eye checkerboard pattern 214 ('R' squares) is brighter than the left-eye checkerboard pattern 215 ('L' squares). This condition of having unequal brightness between the projections of the right- and left-eye images of a stereoscopic pair may be referred to as brightness imbalance. The brightness imbalance is detectable on the screen by the presence of bright and dark artifacts corresponding to, or associated with, the checkerboard patterns 214 and 215.

Second, when gap 332 separating the upper and lower portions of lens system 130 is incorrect, centerlines 326 and 327 of the projection beam path of the right- and left-eye images 122 and 123 pass through polarizers 142 and 143 in a manner such that the light rays for the respective right- and left-eye images, which are represented by centerlines 346 and 347, do not converge at the center 151 of the screen 150. This failure to have convergence of these beam paths at the center of the screen condition is referred to herein as a "mis-convergence" or "non-convergence". Gross mis-convergence is clearly visible on the screen as a separation of the projections of horizontal centerlines 212 and 213. Even a slight mis-convergence is detectable on the screen by the presence of bright and dark artifacts corresponding to, or associated with, the horizontal interfaces in checkerboard patterns 214 and 215.

Third, when lens 130 is rotated in its mount (mount not shown) around center axis of rotation 330 (the axis lies in a horizontal direction) by angle 331, projected right- and left-eye images will be horizontally displaced from each other causing an orientation error, known herein as mis-orientation. Gross mis-orientation is visible on the screen as a separation of projected vertical centerlines 210 and 211. Even a slight mis-orientation is detectable on the screen by the presence of bright and dark artifacts corresponding to, or associated with, the vertical interfaces in checkerboard patterns 214 and 215.

All three calibration errors or mis-alignments are correctable through the use of calibration method 700. Progress in the correction of each of these error conditions is shown in the projection systems illustrated in FIGS. 4C and 5B, with the completely aligned system 100 shown in FIG. 1.

In reference to FIG. 7, during start step 701, a reel or loop of film containing right- and left-eye images 122 and 123 of test pattern 200 is threaded onto projector 100 and started. Arc lamp 101 is lit and the douser (not shown, but well known) is opened. In order to achieve a proper calibration of the projector, it is preferable to permit the projector to run until a normal operating temperature is reached.

In projection step 702, curtains, if any, are opened, and screen masking (not shown) is set to the expected aspect ratio. This step allows right- and left-eye images 122 and 123 of test pattern 200 to be projected onto screen 150 so that the operator or automatic system can focus the image onto the screen. Upper and lower screen masking, which are set respectively at the top and bottom edges 152 and 153 of the viewable portion of the screen, are also used as a framing target for centering the projection on the screen. Initial focus may only be a coarse or preliminary adjustment, since the system may be substantially misaligned. As the alignment errors are corrected, additional focusing may be required.

Initial focus may be performed in a variety of ways. For example, some text or other features in the projected test patterns may be brought into visual focus. The specific focus mechanism may vary depending on the particular lens assembly design. In general, focus is set by moving or translating lens system 130 toward or away from film 120 along axis 330 (see FIG. 3C). In some cases, the upper portion of the lens system 130 can be adjusted independently with respect to the lower portion of the lens in the over-under lens assembly shown in the figures.

In vertical centerline evaluation step 703, the projected left- and right-eye images are examined for possible mis-alignment between the vertical centerlines of the crosshairs for the stereoscopic pair. For example, a horizontal displacement between the projections 310 and 311 of right- and left-eye vertical centerlines 210 and 211, as shown in FIG. 3A, indicates a mis-alignment. Horizontal centerline projections 312 and 313 are temporarily disregarded in this step. The adjustment performed in this step corrects the horizontal displacement of the images, at least coarsely. Finer adjustments can be achieved using the checkerboard patterns at a later stage of the method. Until projected centerlines 310 and 311 are more closely aligned into a position of substantial overlap, alignment of projections 314 and 315 from right- and left-eye opposing checkerboards 214 and 215 is temporarily ignored at this stage.

When projected vertical centerlines 310 and 311 are mis-aligned by a horizontal offset to either the left or the right, as shown in FIG. 3A, where projected centerline 310 appears to the left of projected centerline 311 on screen 150, corrective action is taken in orientation adjustment step 704. Referring to FIG. 3C, lens orientation is adjusted by rotating lens system 130 about its center axis 330 in the direction of arrow 333. This type of lens rotation reduces angle 331 toward zero. Angle 331 is defined by two dashed lines in FIG. 3C, wherein one dashed line corresponds to a transverse axis through the centers of the upper and lower portions of the lens (see, for example, cross-sectional view at the exit end of lens assembly), and the other dashed line corresponds to a vertical baseline. In this way, angle 331 represents a deviation of the transverse axis of the lens from vertical.

When the offset between projected centerlines 310 and 311 appears reversed (not shown) so that projected centerline 310 appears to the right of projected centerline 311 on screen 150, the proper corrective action in orientation adjustment step 704 would be to rotate lens 130 in the direction opposite to arrow 333. In other words, the orientation of lens system 130 is adjusted in one of two directions by rotation of the lens about center axis 330 to achieve at least a coarse horizontal alignment, as shown in FIG. 3B by an improved overlap of the projected vertical centerlines 310' and 311' of the stereoscopic images, in contrast to the misalignment in FIG. 3A.

The corrective adjustment described above for orientation adjustment step 704 should result in the projections of right- and left-eye vertical centerlines 210 and 211 at least partially overlapping, as illustrated in FIG. 3B with projected centerlines 310' and 311'. When a coarse alignment has been achieved for the projected vertical centerlines 310' and 311', common image elements in the test pattern such as vertical centerlines 210 and 211, focus targets 201, and background grid 209 in right- and left-eye images 122 and 123 should overlap when properly projected. These common image elements are of diminishing value for achieving any more precise alignment of the images at this time, so calibration method 700 continues at step 705 by performing a horizontal centerline evaluation.

In horizontal centerline evaluation step 705, the projected left- and right-eye images are examined for possible mis-alignment between the horizontal centerlines of the crosshairs in the test pattern for the stereoscopic image pair. For example, FIG. 4A shows a vertical displacement between the projections 412 and 413 of right- and left-eye horizontal centerlines 212 and 213, indicating a horizontal centerline mis-alignment. Distance or separation 411 between horizontal centerline projections 412 and 413 corresponds to the amount by which non-converged projection centerlines 346 and 347 in FIG. 3C are separated at screen 150. Until horizontal centerline projections 412 and 413 are more closely aligned into a position of substantial overlap, alignment of projections 414 and 415 of right- and left-eye opposing checkerboards 214 and 215 is ignored temporarily at this stage.

When horizontal centerline projections 412 and 413 are misaligned as shown in FIG. 4A so that projected centerline 412 appears above projected centerline 413 on screen 150, proper corrective action in convergence adjustment step 706 is taken by rotating an adjustment mechanism 135 (see FIG.

4C) such as a calibration screw or other suitable alternatives to reduce gap 332 separating the upper and lower portions of lens system 130. Reduction of gap 332 brings horizontal centerline projections 412 and 413 closer together into substantial overlap, thereby reducing the vertical misalignment or mismatch between the projected left- and the right-eye images. This corrective result can be achieved by turning the adjustment mechanism 135 in a direction shown by arrow 433 in FIG. 4C.

Each lens assembly may have a different design from that shown in the figures, including different configurations for the gap and adjustment mechanisms. One embodiment of a lens assembly may provide a gap distance that is constant along the longitudinal direction of the lens. Another embodiment may provide for a variable gap that is greater at the end closer to the screen than at the end closer to the film. Yet another embodiment may provide for a gap that is variable at one end of the lens, but fixed at the other end. Regardless of the particular details of each lens assembly, convergence correction by gap adjustment is still performed generally as described herein.

When the offset between projected centerlines 412 and 413 appears reversed compared to those in FIG. 4A (not shown) so that right-eye projected centerline 412 appears below left-eye projected centerline 413 on screen 150, the corrective action in convergence adjustment step 706 calls for rotating adjustment mechanism 135 in the direction opposite to arrow 433 (see FIG. 4C) to increase the gap 332 between the upper and lower portions of lens 130. By adjusting the gap 332, proper convergence of the projected right- and left-eye images in a vertical direction can be achieved, as indicated by the alignment of horizontal centerlines in FIG. 4B. In other words, the convergence of lens system 130 is adjusted in one of two directions by a gap adjustment between the upper and lower lens portions to achieve at least a coarse vertical alignment, as shown in FIG. 4B by an improved overlap of the horizontal centerlines of the stereoscopic images, in contrast to the misalignment in FIG. 4A.

Depending upon the actual embodiment of lens system 130, changing the size of gap 332 may also alter the position of the centerline 330 of lens 130 with respect to aperture 110. For example, in a lens of the Condon design, the mounting is rigid to one half of the lens and the other half pivots along one edge so that as the gap lens is opened and closed, the centerline moves up and down, and slightly left and right. In another embodiment in which the lens mount allows both the top and bottom half to pivot, or to move in parallel, toward or away from each other, there will be no change in the centerline as the gap is varied. Correcting for this movement by reframing the film 120 in aperture 110 can result in a focus shift. "Framing" is a setting on a projector which effectively moves the target where the film parks while the shutter is opened. When the shutter is closed, the film advances. The result is that the middle of the film frame shifts up or down with respect to the center of the lens. If the lens opens up to improve convergence, the center of the image may now be shifted, either up or down, depending on the actual design of the lens. This movement can be corrected by adjusting the framing and moving the images down or up in motion counter to direction of the image shift.

For some embodiments of lens system 130, adjustment mechanism 135 may be located in a place that does not allow convenient access, if any access is permitted at all, during projection. In such cases, corrections to the convergence of the stereoscopic images may require a modification to process 700, in which steps 702, 703, 704—for focus, vertical centerline alignment evaluation, and vertical centerline adjustment, respectively—must be repeated following any convergence adjustment.

Figure 4B:
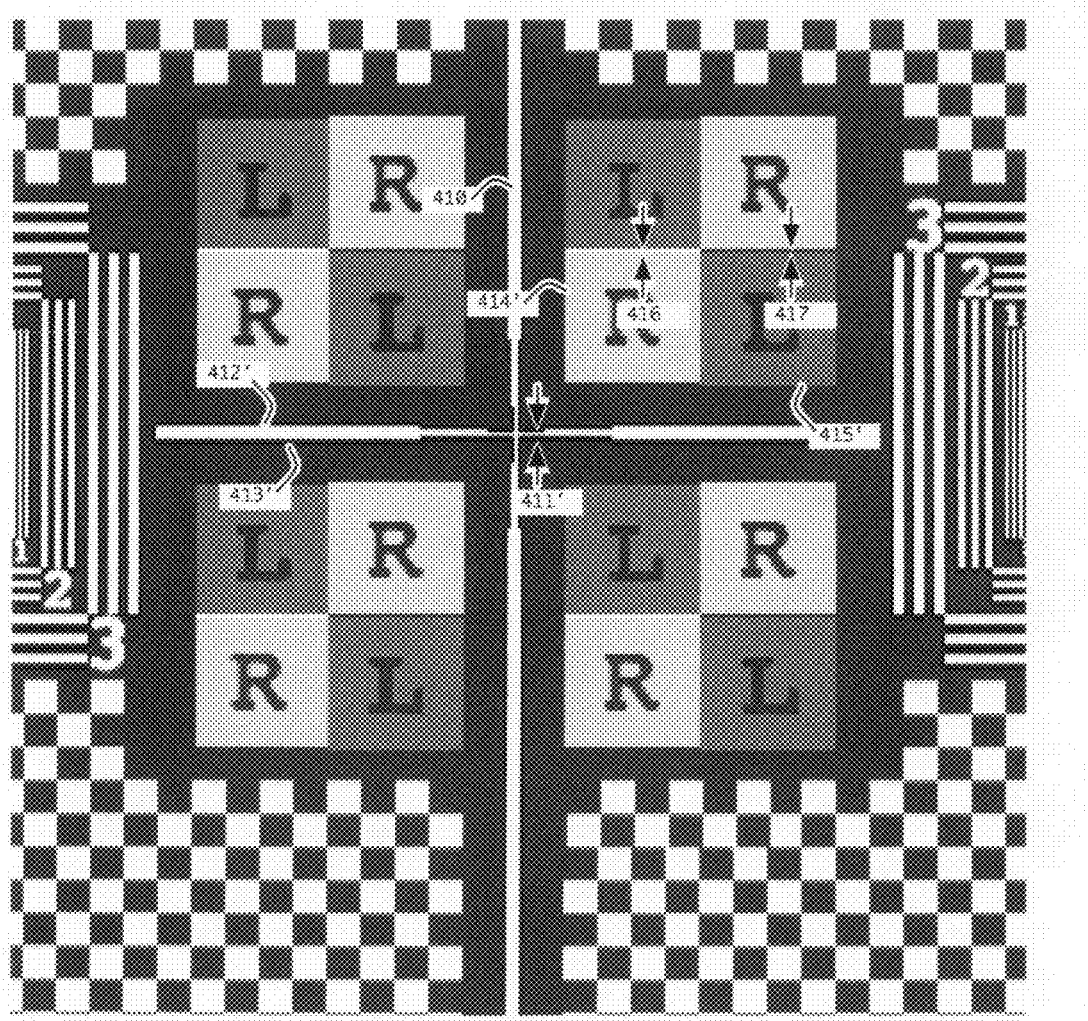
FIG. 4B is a close up of a center portion of the projection of the right- and left-eye images of the test pattern in FIG. 2 as viewed without 3D glasses, with a slight dual lens mis-convergence, but the brightness imbalance as in FIG. 4A.
Figure 4C:
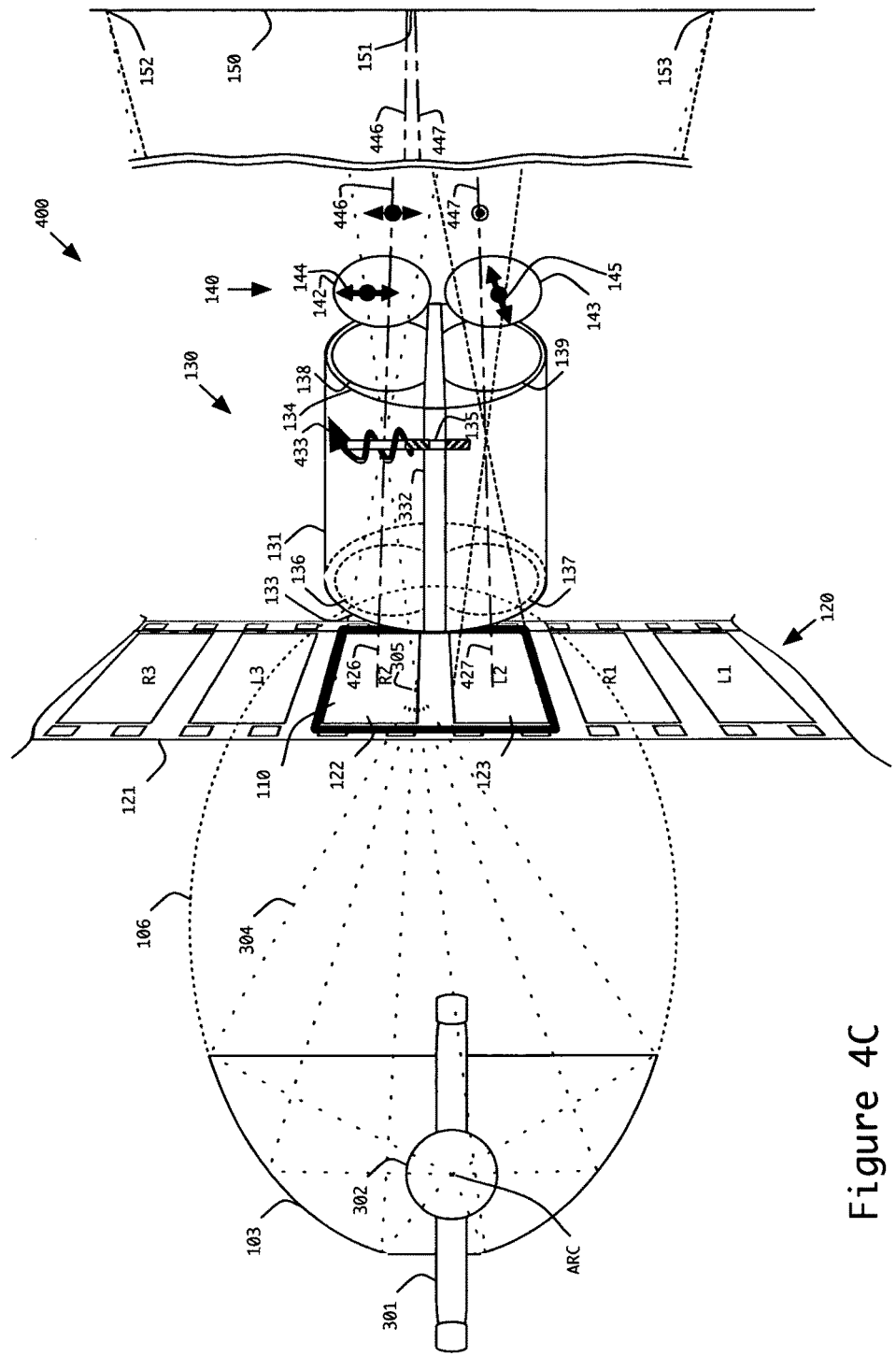
FIG. 4C is an illustration of the corrective action to be taken for the dual lens mis-convergence of FIGS. 4A and 4B.

Corrective adjustment made in convergence adjustment step 706 should result in the projections of right- and left-eye horizontal centerlines 212 and 213 at least partially overlapping, as shown in FIG. 4B for projected horizontal centerlines 412' and 413' so that at least a coarse convergence or vertical alignment is achieved between the horizontal centerlines of the right- and left-eye images. As discussed earlier in the orientation step, common image elements such as horizontal centerlines 212 and 213, focus targets 201, and background grid 209 in right- and left-eye images 122 and 123, which should substantially overlap when properly projected, are of diminishing or limited value for achieving a more precise alignment at this time. Therefore, calibration method 700 continues at step 707.

In brightness balance evaluation step 707, the projected left- and right-eye images are examined for any presence of brightness imbalance. FIG. 5A shows an example of different brightness between projections 514 and 515 of right- and left-eye opposed checkerboards patterns 214 and 215, in which the right-eye image or pattern 514 is brighter than the left-eye image 515. Such an imbalance in brightness is correctable by adjusting the position of the illumination source, or more particularly, the position of arc lamp 301. For some projectors, an adjustment to reflector 103 or to other condenser optics (not shown) or to another mechanism such as arc positioning magnets may be required in addition to or instead of adjustments to the lamp 301.

In the specific example shown in FIG. 5A, the projected checkerboard 514 for the right eye appears brighter than projected checkerboard 515. Corrective action in this case is taken in brightness adjustment step 708 by raising the position of envelope 302 (or the illumination source) in the direction of arrow 501 as shown in FIG. 5B. This adjustment actually causes image 305 of the arc at the aperture 110 to be lowered. It should be understood that the right eye image appears brighter when image 305 of the arc is located above the center location in the aperture, because of the higher flux near the center of the illumination field compared to the edges. This adjustment is repeated until projected checkerboards 514 and 515 appear to have a substantially equal level of brightness.

If the relative brightness of checkerboard projections 514 and 515 is opposite to that shown in FIG. 5A so that right-eye checkerboard projection 514' appears dimmer than left-eye checkerboard projection 515' (see FIG. 5C), then the image of the arc is too low in aperture 110. Correction of this type of imbalance is accomplished by moving envelope 302 or illumination source down in a direction opposite to that shown by arrow 501 in FIG. 5B.

In brightness balance evaluation step 707, the alignments of superimposed projected vertical and horizontal centerlines 510 and 511 (see FIG. 5A) of the crosshairs in the test pattern are temporarily ignored. Slight misalignments between the opposed checkerboard projections 514 and 515 may produce discontinuities in brightness beyond merely one of checkerboard projections 514 and 515 being brighter than the other checkerboard projection. This issue is addressed in more detail below.

When this first stage of coarse adjustments for lens orientation, convergence, and brightness balance in steps 702-708 is completed, a second stage of adjustments is made in method 700 to achieve finer alignments and more precise corrections. This second stage of adjustments begins with step 702', where a fine adjustment is made to framing to ensure that the image is properly centered in aperture 110 and on the screen. Focussing is also performed at this time. Since the coarse alignment has been completed, the use of focus targets 201 (see FIG. 2) is more meaningful for refining the focus because these focus targets are now better aligned than they were earlier in the alignment process. The continued use of these focus targets 201 also remains meaningful and beneficial in subsequent or final focus checks.

In orientation evaluation step 703', vertical centerline projections 310' and 311' (see FIG. 3B) will appear substantially overlapped as a result of the coarse alignment achieved in step 704. However, the vertical interfaces (or regions of overlap) between checkerboard projections 314' and 315' from the test pattern images will continue to exhibit regions of increased brightness 316 and decreased brightness 317 until substantially complete overlap of the vertical centerline projections is achieved. It is therefore possible to use these regions of increased brightness 316 and decreased brightness 317 in the vertical interface regions as a vernier calibration to achieve a much finer level of correction for the lens orientation. In this way, the orientation of the lens assembly 130 can be adjusted to reduce the angle 331 (see FIG. 3C) to zero thereby substantially eliminating the convergence error.

When projections 314' and 315' of right- and left-eye opposing checkerboards 214 and 215 are misaligned as shown in FIG. 3B (with a slight mis-orientation and a gross mis-convergence), the following two artifacts will be observable without viewing the projected images through 3D glasses. First, for a 'R'-labeled square (of right-eye checkerboard projection 314') that is positioned to the right of a 'L'-labeled square (of left-eye checkerboard projection 315'), a bright region 316 would appear at the vertical interface of these two horizontally adjacent R-square and L-square, when the right-eye checkerboard projection 314' is offset towards the left relative to the left-eye checkerboard projection 315' (due to the slight mis-orientation). In this case, the relatively narrow bright region 316 corresponds to an overlap region between the R-square and L-square. Second, at the vertical interface between a "R"-labeled square that is positioned to the left of a 'L'-labeled square, the same left offset of the right-eye checkerboard projection 314' would lead to the R-square being displaced farther away to the left from the L-square, resulting in a dark region 317 instead. When the specific misalignment shown in FIG. 3B is observed (i.e., the projected image of right-eye checkerboard 314' has a slight horizontal offset towards the left with respect to the left-eye checkerboard 315'), corrective action is taken in fine orientation adjustment step 704' by rotating lens 130 about its center axis 330 in the direction of arrow 333 shown in FIG. 3C in order to reduce angle 331 toward zero. The instant adjustment will be finer, and will produce a more accurate correction of orientation error, than the adjustment in the first orientation adjustment step 704. The finer adjustment is achieved predominately from the use of the checkerboard as visual gauge, and to a lesser degree, due to the improved alignments elsewhere in the system. These latter alignments, though they are orthogonal or independent to the instant alignments, appear to have a detrimental effect on a person's powers of observation until these latter misalignments are at least somewhat corrected. In an alternative embodiment of the present method, the use of the checkerboard may also be performed in conjunction with steps 703/704 instead of waiting until step 704' as a supplement to or even instead of the crosshair adjustment.

As discussed in a similar scenario earlier, when the locations of bright and dark regions 316 and 317 are reversed (not shown), corrective action in fine orientation adjustment step 704' calls for rotation of lens 130 in the direction opposite to arrow 333.

Corrective adjustment made in fine orientation adjustment step 704' is expected to result in substantially superimposed projection 410 and 510 (see FIGS. 4A, 5A, respectively) of vertical centerlines 210 and 211 of the crosshairs, and the substantial absence of vertical bright and dark regions 316 and 317 along vertical interface regions between projected right- and left-eye opposing checkerboards (see regions 414 and 415 in FIG. 4A). When this orientation is achieved with the projected left- and right-eye images precisely aligned horizontally with respect to each other, calibration method 700 continues at step 705', in which the convergence error is further evaluated by examining horizontal interface regions of checkerboard patterns in projected right- and left-eye images.

Referring back to FIG. 4B, since coarse convergence has already been established in step 706, projections 412' and 413' of right- and left-eye horizontal centerlines 212 and 213 appear to be substantially overlapped-, with distance 411' being relatively small such as an inch or less at the screen 150, and may correspond to a mere 1-4 pixels in a digitally written film. However, the horizontal interface regions between opposed checkerboard projections 414' and 415' will exhibit regions of increased brightness 416 and decreased brightness 417 as long as there is a convergence error. These horizontal interface regions can be used in convergence error evaluation step 705' as a vernier calibration tool to provide a finer resolution and a more accurate adjustment for convergence correction, as discussed below.

When projections 414' and 415' of right- and left-eye opposing checkerboards 214 and 215 are misaligned as shown in FIG. 4B, the following two artifacts will be observable without the use of 3D glasses for viewing the images. First, for a 'R'-labeled square (of right-eye checkerboard projection 414') that is positioned below an 'L'-labeled square (of left-eye checkerboard projection 415'), a bright region 416 would appear at the horizontal interface of these two vertically adjacent R-square and L-square, when the right-eye checkerboard projection 414' is offset towards the top relative to the left-eye checkerboard projection 415'. In this case, the bright region 416 corresponds to a narrow overlap region between the R-square and the L-square. Second, at the horizontal interface between a 'R'-labeled square that is positioned above a 'L'-labeled square, the same upwards offset of the right-eye checkerboard projection 414' would result a dark region 417 (because the R-square would be displaced farther away from its neighboring L-square).

When this specific misalignment shown in FIG. 4B is observed (i.e., the projected image of right-eye checkerboard 414' has a slight vertical offset or displacement towards the top with respect to the left-eye checkerboard 415'), corrective action is taken in fine convergence adjustment step 706' by rotating convergence adjustment mechanism 135 in the direction of arrow 433 shown in FIG. 4C in order to reduce the size of gap 332 and thereby bring projected image centerlines 446 and 447 closer together at screen 150. This adjustment will produce finer result and a more accurate convergence correction than the adjustment performed in first convergence adjustment step 706. In this case, the finer adjustment is likely to result from both the improved visual gauge provided by the horizontal interfaces regions produced by the opposed checkerboards in the test pattern and the improved focus. Focus and convergence are more tightly coupled with each other than with orientation since a change in focus can alter convergence.

If the locations of bright and dark regions 416 and 417 at the horizontal interfaces are reversed (not shown) from that in FIG. 4B, corrective action in fine orientation adjustment step 706' would call for rotating convergence adjustment mechanism 135 in the direction opposite to arrow 433 thereby increasing the size of gap 332.

As previously mentioned, depending on the specific configuration of lens system 130, the adjustment to gap 332 may lead to an undesirable consequence (e.g., focus shift), or the adjustment mechanism may not be readily accessible. In these situations, a modified process may be used for convergence adjustment, in which fine focus and vertical alignment evaluation and their respective coarse and fine adjustments are needed and steps 702', 703, 704, 703', and 704' must be repeated following a fine adjustment of convergence.

Corrective adjustment made in fine convergence adjustment step 706' is expected to result in substantially superimposed projection 511 (FIG. 5A) of the horizontal centerlines 212 and 213 in the crosshairs of the test pattern, as well as the substantial absence of horizontal bright and dark regions 416 and 417 along horizontal interface regions between projected right- and left-eye opposing checkerboards (see regions 514 and 515 in FIG. 5A). When the projected left- and right-eye images are aligned vertically with respect to each other, convergence correction is completed and calibration method 700 proceeds to step 707'.

In fine brightness balance evaluation step 707', the projected left- and right-eye images are examined for any residual brightness imbalance or brightness level difference remaining after the coarse adjustment performed in step 708. For example, projections 514 and 515 of right- and left-eye checkerboards patterns 214 and 215 are of different brightness, as shown in FIG. 5A or 5C. Since brightness imbalance has been at least partially corrected in step 708, the brightness difference detected at step 707' should be less than the level seen earlier in the process as shown in FIG. 5A, for example. When there is still a brightness imbalance, corrective adjustments can be made according to the descriptions for steps 707 and 708. But such additional corrective adjustments would only be necessitated in step 707', if the projection of the checkerboard patterns 214 and 215 shows up as residual light and dark regions of the checkerboard pattern. If the projected field including the checkerboard squares is at a substantially uniform or equal brightness (darkness) level such that the individual checkerboard squares are no longer distinguishable from each other (i.e., no visible or discernible interfaces between the checkerboard squares, thus minimizing the appearance of the checkerboard patterns), as shown in composite projected field 612 in FIG. 6, then no additional alignment or adjustment is needed to further correct brightness balance.

In an alternative embodiment, an additional check of focus may be made at this time using focus target projections 613, with emphasis being given to those toward the center of the screen 150.

At the conclusion of steps 707' or 708', the projection system 100 is properly focused and aligned through the use of test film 120 and test pattern 200m thereby exhibiting proper orientation, convergence, and brightness balance. Presentation readiness step 709 involves removing the test film from projector 100 and threading the actual presentation film. Since the alignment and convergence adjustments for lens 130 are mechanically locked off or otherwise unaltered by a film change in commercial film projectors, no further adjustment should be needed to lens system 130. Nonetheless, a final check of focus (optional) can be made as the leader for the presentation film (not shown) is advanced and positioned ready for playout. In step 710, the presentation film is projected with projection system 100. At the end of the film, the presentation film is re-threaded and focus is checked for repeat performances. The operation of step 710 may be repeated indefinitely or as needed. Method 700 concludes at step 711.

Figure 8:
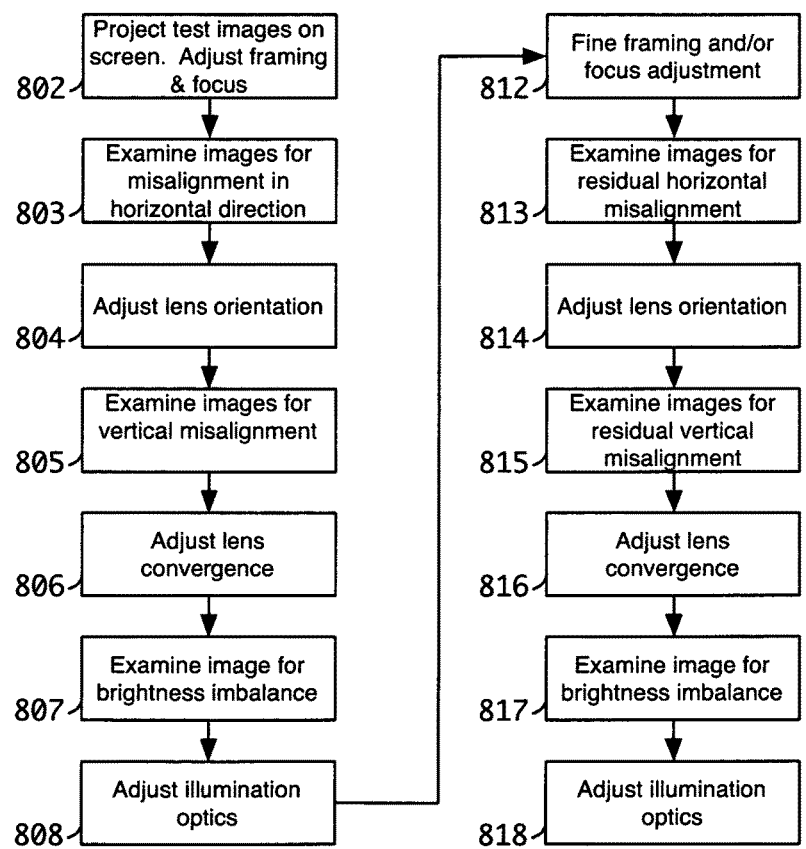
FIG. 8 illustrates another embodiment of an exemplary method for optical alignment of the 3D film projection system.

FIG. 8 illustrates another embodiment of a calibration method 800, which can be used for performing optical alignments in a stereoscopic lens assembly such as lens assembly 130 for use in 3D film projection. In step 802, test images for a stereoscopic pair such as those shown in FIG. 2 are projected on a screen, and framing and focus adjustments are performed so that projected images appear focused on the screen. This may be done in a variety of ways such as by bringing some text or features into visual focus, as already described above. This is similar to step 702 of FIG. 7.

In step 803, projected images are examined for possible misalignment in the lens orientation, as previously discussed for step 703. In step 804, adjustment of the orientation of the lens assembly is performed, as needed, to achieve a coarse alignment based on a first orientation alignment criterion such as by using vertical centerlines 210 and 211 of test pattern 200 as a visual gauge, as discussed in connection with step 704.

In step 805, projected stereoscopic images are examined for possible non-convergence as manifested by a vertical mismatch or offset in the projected left- and right-eye images of a stereoscopic pair, as previously discussed in connection with step 705. In step 806, adjustment is made, as needed, to the separation or gap between the upper and lower portions of the lens assembly so that a coarse convergence can be achieved based on a first convergence criterion such as by using horizontal centerlines 212 and 213 of test pattern 200 as a visual gauge, as previously discussed in connection with step 706.

In step 807, projected stereoscopic images are examined for possible brightness imbalance, as previously discussed for step 707. In step 808, adjustment is made, as needed, to the relative positioning of the illumination optics such as source and/or reflector and the film gate or aperture in order to reduce any brightness imbalance to an acceptable level using a visual gauge such as opposed checkerboard patterns 214 and 215, as previously discussed in connection with step 708.

Steps 802 through 808 may be considered a first stage of alignments, in which coarse alignment results are achieved for the system, specifically, for lens orientation, convergence, and brightness balance.

A second stage of alignments including steps 812-818, which are similar to steps 702'-708' of FIG. 7, is used to achieve a more precise set of alignments and more accurate corrections for the projection system. Step 812 involves making additional adjustments to framing the film in the film gate or aperture and/or additional focusing adjustments.

In step 813, the projected images are examined for residual misalignment in the lens orientation, and in step 814, adjustment is made, if needed, to achieve a more precise alignment based on a second orientation alignment criterion based on the vertical interface regions of checkerboard patterns as a visual gauge, as discussed in connection with step 714. For example, an orientation error caused by a mis-orientation of the lens rotation can give rise to a horizontal offset between projected left- and right-eye images, which can be detected by examining the vertical interface regions of the projected checkerboard patterns for the presence or appearance of adjacent bright or dark lines or regions.

In step 815, the projected images are examined for residual non-convergence, manifested as a vertical misalignment between the projected stereoscopic images. If needed, adjustment is made in step 816 to achieve a more precise convergence based on a second convergence alignment criterion based on the horizontal interface regions of checkerboard patterns as a visual gauge, as discussed above in connection with step 706'. For example, a convergence error caused by an incorrect spacing between the upper and lower portions of a dual-lens system can give rise to a vertical offset between projected left- and right-eye images, which can be detected by examining the horizontal interface regions of the projected checkerboard patterns for the presence or appearance of adjacent bright or dark lines or regions.

In step 817, the projected images are examined for any remaining brightness imbalance. This may result from residual imbalance that remains after adjustment step 808 or, it may arise from over-correction performed in step 808. In step 818, the relative positioning of the illumination optics (e.g., source and/or reflector, etc.) and the film gate or aperture is adjusted to reduce the brightness imbalance between projected left- and right-eye images to an acceptable level using a visual gauge such as opposed checkerboard patterns 214 and 215, as previously discussed in connection with step 708 or 708'. For example, a brightness imbalance caused by a mis-alignment of the illuminator with respect to the film gate would give rise to a brightness difference between the projected left- and right-eye images, which can be detected by examining the relative brightness of the squares in the projected checkerboard patterns. In the presence of brightness imbalance, the projected image will have adjacent light and dark regions (or with relative brightness, e.g., lighter and darker regions) in a pattern that is substantially similar, or maybe identical, to the pattern of relative brightness in the right- and/or left-eye checkerboard patterns.

After the second stage of alignments (e.g., steps 812-818), the projection system will be sufficiently well aligned for 3D film projection. It is noted that the adjustments for lens orientation, convergence, and brightness may also be performed in a different order as illustrated in FIGS. 7 and 8. Additional adjustments to the system including, for example, focus checks or other tasks deemed necessary by operation personnel may also be performed, as needed, prior to film projection.

While the above examples focus on alignment of film-based 3D projection, one or more features of the present invention can also be applied to certain digital 3D projection systems that use separate lenses or optical components to project the right- and left-eye images of stereoscopic image pairs. Such systems may include single-projector or dual-projector systems, e.g., Christie 3D2P dual-projector system marketed by Christie Digital Systems USA, Inc., of Cypress, Calif., U.S.A., or Sony SRX-R220 4K single-projector system with a dual lens 3D adaptor such as the LKRL-A002, both marketed by Sony Electronics, Inc. of San Diego, Calif., U.S.A. In the single projector system, different physical portions of a common imager are projected onto the screen by separate projection lenses.

The above descriptions and illustrations of the test pattern and method of achieving various alignments in the system are exemplary of the various embodiments of the present invention. Certain modifications and variations such as the use of different locations for placing test patterns within an image, different dimensions of test pattern features, different orders of performing certain adjustment steps, or even omitting one or more steps in a method, may also be used to practice of the present invention.

All examples and conditional language recited herein are intended for pedagogical purposes to aid the reader in understanding the present principles and the concepts contributed by the inventor to furthering the art, and are to be construed as being without limitation to such specifically recited examples and conditions.

Moreover, all statements herein reciting principles, aspects, and embodiments of the present invention, as well as specific examples thereof, are intended to encompass both structural and functional equivalents thereof. Additionally, it is intended that such equivalents include both currently known equivalents as well as equivalents developed in the future, including any elements developed at any that perform the same function, regardless of structure.

A number of implementations have been described herein. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. In particular, although illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. Accordingly, these and other implementations are contemplated by this application and are within the scope of the following claims.

The invention claimed is:

1. A test pattern for use in aligning a stereoscopic projection system, the test pattern comprising:
   a first image and a second image forming a stereoscopic image pair;
   the first image having a first pattern including a first plurality of adjacent light and dark regions;
   the second image having a second pattern including a second plurality of adjacent light and dark regions, wherein the second pattern is a conjugate of the first pattern with respect to positioning of the respective pluralities of adjacent light and dark regions;
   wherein a combination of first and second images projected by the stereoscopic projection system indicates at least one of: an orientation error, a convergence error and a brightness balance error, in the stereoscopic projection system, wherein:
   the orientation error associated with a horizontal offset between the first and second projected images is indicated along substantially vertical regions of the projected first and second patterns;
   the convergence error associated with a vertical offset between the first and second projected images indicated along substantially horizontal regions of the projected first and second patterns; and
   the brightness balance error is indicated by adjacent light and dark regions in a pattern substantially similar to at least one of the first and second patterns.

2. The test pattern as defined in claim 1, wherein the first pattern includes two squares arranged diagonally in a first direction, and the second pattern includes two squares arranged diagonally in a second direction that is orthogonal to the first direction.

3. The test pattern as defined in claim 2, wherein the first pattern and the second pattern each exhibit a checkerboard pattern having at least two light regions and two dark regions.

4. A method for aligning a stereoscopic projection system, the method comprising:
   projecting a first image and a second image forming a stereoscopic image pair, the first image having a first pattern including a first plurality of adjacent light and dark regions, the second image having a second pattern including a second plurality of adjacent light and dark regions, wherein the second pattern is a conjugate of the first pattern with respect to positioning of the respective pluralities of adjacent light and dark regions;
   adjusting orientation of a stereoscopic lens in response to presence of substantially vertical interface regions between the projected first and second patterns, the substantially vertical interface regions exhibiting light and dark patterns indicative of a horizontal offset between the projected first and second images;
   adjusting convergence of the stereoscopic lens in response to presence of substantially horizontal interface regions between the projected first and second patterns, the substantially horizontal interface regions exhibiting light and dark pattern indicative of a vertical offset between the projected first and second images; and
   adjusting brightness balance of the stereoscopic projection system in response to presence of adjacent light and dark regions in a projected pattern substantially similar to at least one of the first and second patterns.

5. The method as defined in claim 4, wherein the first pattern includes two squares arranged diagonally in a first direction, and the second pattern includes two squares arranged diagonally in a second direction that is orthogonal to the first direction.

6. The method as defined in claim 5, wherein the first pattern and the second pattern each exhibit a checkerboard pattern having at least two light regions and two dark regions.

7. The method as defined in claim 4, wherein the step of adjusting brightness balance further includes adjusting the brightness of the stereoscopic projection system for at least one of the first and second projected images until appearance of the first and second patterns are substantially minimized.

8. The method as defined in claim 7, wherein the step of adjusting convergence further includes adjusting a vertical position of the stereoscopic projection system for at least one of the first and second projected images until appearance of the substantially horizontal interface regions related to the vertical offset between the first and second projected images has been minimized.

9. The method as defined in claim 5, wherein the step of adjusting orientation further includes adjusting a horizontal position of the stereoscopic projection system for at least one of the first and second projected images until appearance of the substantially vertical interface regions related to the horizontal offset between the first and second projected images has been minimized.

10. The method as defined in claim 5, wherein the stereoscopic projection system is selected from one of a dual lens stereoscopic projection system and a dual projector system.

11. A method for aligning a stereoscopic projection system, the method comprising:
   projecting a first image and a second image forming a stereoscopic image pair, the first image having a first pattern including a first plurality of adjacent light and dark regions, the second image having a second pattern including a second plurality of adjacent light and dark regions, wherein the second pattern is a conjugate of the first pattern with respect to positioning of the respective pluralities of adjacent light and dark regions;
   correcting an error related to at least one of orientation and convergence for the stereoscopic projection system by performing at least one of steps (a) and (b), wherein:
   step (a) comprises adjusting orientation of a stereoscopic lens in response to presence of substantially vertical interface regions related to a horizontal offset between the first and second projected images, the substantially vertical interface regions exhibiting a light and dark pattern indicative of the horizontal offset; and
   step (b) comprises adjusting convergence of the stereoscopic lens in response to presence of substantially horizontal interface regions related to a vertical offset between the first and second projected images, the substantially horizontal interface regions exhibiting a light and dark pattern indicative of the vertical offset; and
   adjusting brightness balance of the stereoscopic projection system in response to presence of adjacent light and dark regions in a projected pattern substantially similar to at least one of the first and second patterns.

12. The method as defined in claim 11, wherein the step of adjusting brightness balance further includes adjusting the brightness of the stereoscopic projection system for at least one of the first and second projected images until appearance of the first and second patterns are substantially minimized.

13. The method as defined in claim 11, wherein the step of adjusting convergence further includes adjusting a vertical position of the stereoscopic projection system for at least one of the first and second projected images until appearance of the substantially horizontal interface regions related to the vertical offset between the first and second projected images has been minimized.

14. The method as defined in claim 11, wherein the step of adjusting orientation further includes adjusting a horizontal position of the stereoscopic projection system for at least one of the first and second projected images until appearance of the substantially vertical interface regions related to the horizontal offset between the first and second projected images has been minimized.

15. The method as defined in claim 11, wherein the stereoscopic projection system is selected from one of a dual lens stereoscopic projection system and a dual projector system.

* * * * *